(12) United States Patent  (10) Patent No.: US 8,988,380 B2
Sato et al.  (45) Date of Patent: Mar. 24, 2015

(54) DISPLAY APPARATUS, DISPLAY METHOD, AND DISPLAY PROGRAM

(71) Applicant: Panasonic Corporation, Osaka (JP)

(72) Inventors: Hiroyuki Sato, Kanagawa (JP); Tatsuro Igarashi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/108,728

(22) Filed: Dec. 17, 2013

(65) Prior Publication Data

US 2014/0184538 A1 Jul. 3, 2014

(30) Foreign Application Priority Data

Dec. 28, 2012 (JP) ................................. 2012-289072

(51) Int. Cl.
*G06F 3/041* (2006.01)
*G06F 3/033* (2013.01)

(52) U.S. Cl.
CPC ....................................... *G06F 3/041* (2013.01)
USPC .......................................... 345/173; 345/179

(58) Field of Classification Search
CPC ............. G06F 3/0488; G06F 3/04883; G06F 2203/04101; G06F 3/03545; G06F 3/0317; G06F 3/03547; G06F 2203/04108; G06F 2209/502; G06K 9/222
USPC .................................................. 345/173, 179
See application file for complete search history.

(56) References Cited

U.S. PATENT DOCUMENTS

| 2009/0102788 | A1* | 4/2009 | Nishida et al. ................ 345/158 |
| 2010/0125787 | A1* | 5/2010 | Chihara et al. ................ 715/702 |
| 2011/0175832 | A1* | 7/2011 | Miyazawa et al. ............ 345/173 |
| 2012/0229392 | A1* | 9/2012 | Morita .......................... 345/173 |
| 2012/0235947 | A1* | 9/2012 | Yano et al. .................... 345/173 |
| 2013/0170719 | A1* | 7/2013 | Rezaee et al. ................ 382/131 |

FOREIGN PATENT DOCUMENTS

| JP | 9-101874 | 4/1997 |
| JP | 2001-005599 | 1/2001 |
| JP | 2008-287323 | 11/2008 |
| JP | 2012-190215 | 10/2012 |

OTHER PUBLICATIONS

Japan Office Action, mailed Aug. 27, 2013, from Japan Patent Office (JPO) (together with English Language translation as well), for corresponding Japanese Patent Application.
Japan Office Action (Decision to Grant Patent), mailed Jan. 28, 2014, for corresponding Japanese Patent Application.

* cited by examiner

*Primary Examiner* — Aneeta Yodichkas
(74) *Attorney, Agent, or Firm* — Greenblum & Bernstein, P.L.C.

(57) ABSTRACT

A display apparatus includes a display unit configured to display a target item, a sensor unit configured to detect a commanding medium which is placed close to the display unit, and a proximity manipulation determination unit configured to judge a target item that corresponds to a closed figure formed by a movement locus of the commanding medium detected by the sensor unit, and determines whether a prescribed manipulation is performed for the target item.

15 Claims, 26 Drawing Sheets

(1)　(2)　(3)

(1)　(2)　(3)

| (COORDINATES OF CENTER OF GRAVITY) $= \dfrac{\vec{A}+\vec{B}+\vec{C}}{3}$ | (COORDINATES OF CENTER OF GRAVITY) $= \dfrac{\vec{A}+\vec{B}+\vec{C}+\vec{D}}{4}$ | (COORDINATES OF CENTER OF GRAVITY) $= \dfrac{\vec{A}+\vec{B}+\vec{C}+\vec{D}+\vec{E}}{5}$ |

FIG. 9A

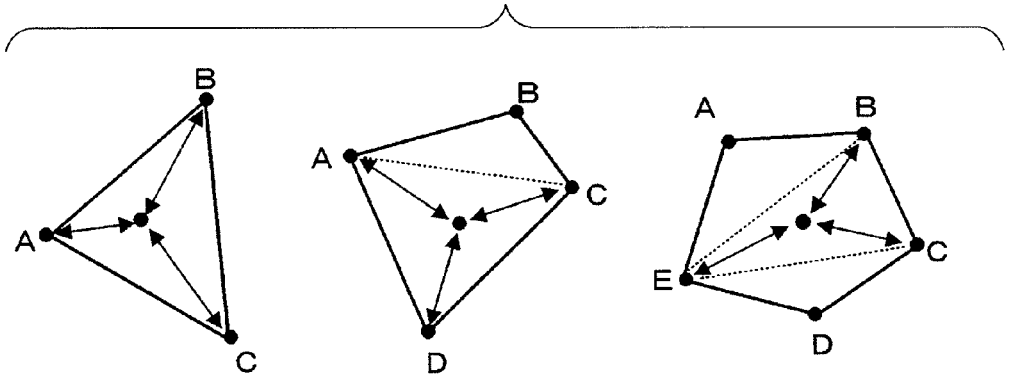

FIG. 9B

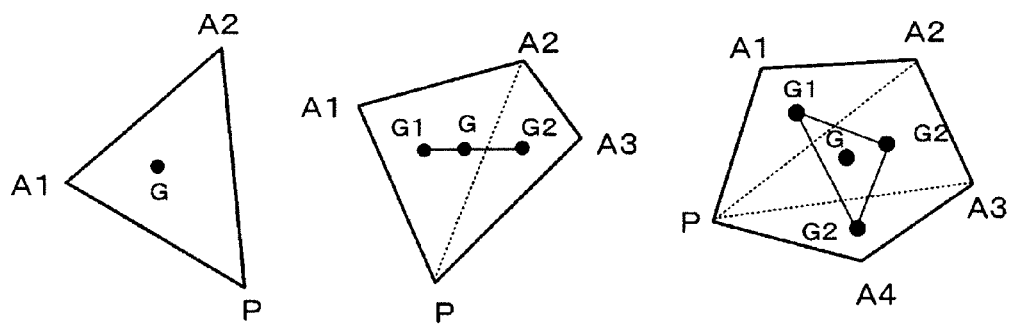

IN THE CASE OF A POLYGON HAVING n APICES, A REFERENCE APEX IS SET AND THE OTHER APICES ARE DENOTED BY $A_1, A_2, ..., A_{n-1}$ IN A PRESCRIBED DIRECTION (P AND $A_1, A_2, ..., A_{n-1}$ ALSO REPRESENT THEIR COORDINATES). THE CENTER OF GRAVITY, $G_k$, OF A TRIANGLE HAVING APICES P, $A_k$ AND $A_{k+1}$ IS GIVEN BY $$G_k = \frac{P + A_k + A_{k+1}}{3}$$

LET $S_k$ REPRESENT THE AREA OF THE TRIANGLE HAVING THE APICES P, $A_k$ AND $A_{k+1}$. THEN THE SURFACE CENTROID G OF THE POLYGON HAVING n APICES IS OBTAINED BY AVERAGING $G_k$'S USING $S_k$'S AS WEIGHTS:

$$G = \frac{\sum_{k=1}^{n-2} S_k \times G_k}{\sum_{k=1}^{n-2} S_k}$$

FIG. 15A
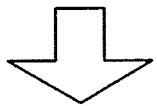
FIG. 15B
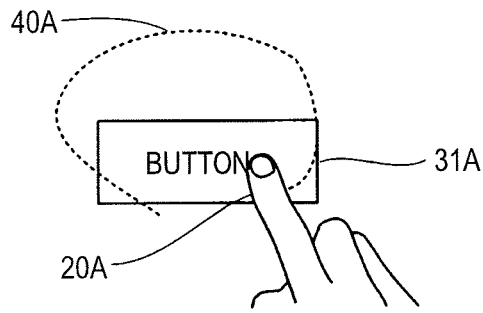
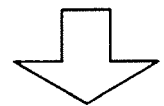
FIG. 15C
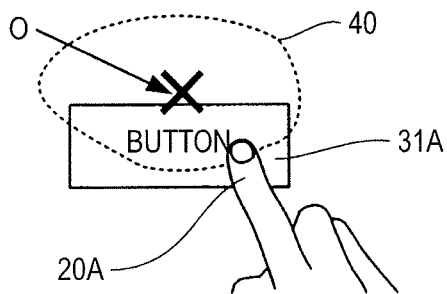
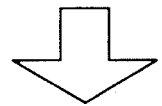
FIG. 15D
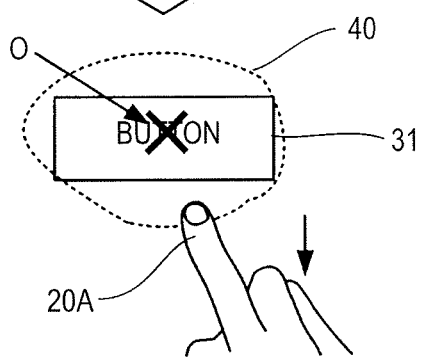

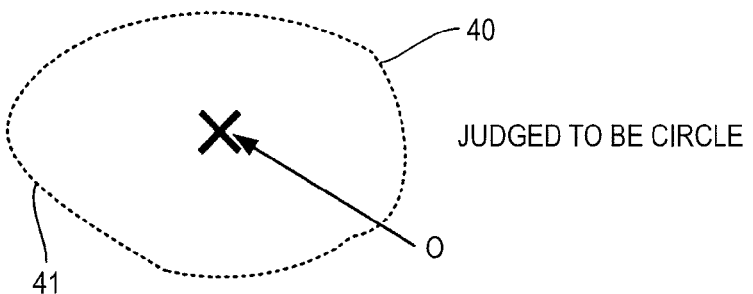
FIG. 20A  JUDGED TO BE CIRCLE
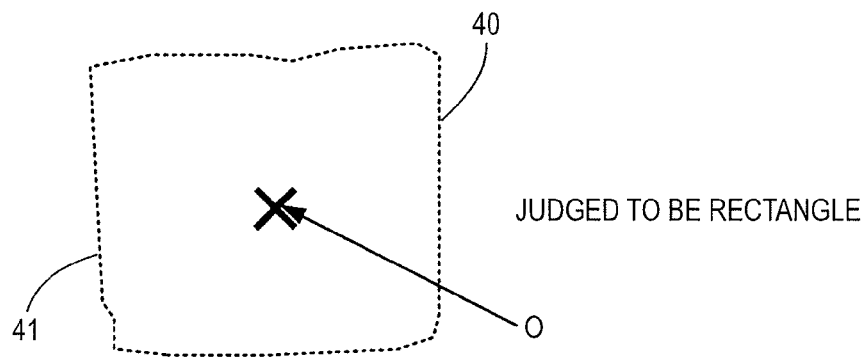
FIG. 20B  JUDGED TO BE RECTANGLE
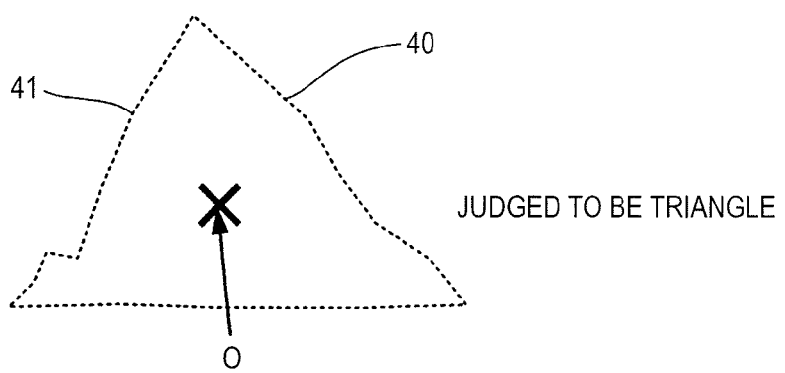
FIG. 20C  JUDGED TO BE TRIANGLE

DISPLAY APPARATUS, DISPLAY METHOD, AND DISPLAY PROGRAM

BACKGROUND

The present invention relates to a display apparatus, a display method, and a display program which enable a manipulation from a position that is close to a display unit.

In recent years, terminals such as smartphones which can be manipulated through a touch screen have come into wide use. Users can select such GUI (graphical user interface) components as icons, buttons, and menu items and make various manipulations using a finger(s) or a pen device (stylus). However, since manipulations are performed through contact to the touch screen, in the case where many icons etc. are displayed, an erroneous manipulation may occur because icons are hidden by a finger or the like. If a manipulation from a position that is a little distant from (close to) the touch screen is enabled, various new kinds of manipulation would be made possible.

For example, JP-A-2008-287323 discloses a technique for displaying a picture which enables another input manipulation by enlargement-displaying a prescribed region around a proximity point using a touch screen which detects coming into proximity or contact of a finger or the like. It is possible to notify the user of what portion is enlarged and what kind of information is enlargement-displayed by displaying, in the vicinity of the enlarged region, additional information relating to the information displayed in the enlarged region. Furthermore, when it is necessary to change the information displayed in the enlarged region, a manipulation picture display/control means displays an input manipulation picture in response to a finger manipulation at a display position of the information the user wants to change. Thus, the user can change the displayed information by manipulating the input manipulation picture.

However, in the technique of JP-A-2008-287323, although additional information can be obtained by detecting coming into proximity of a finger or the like, an actual manipulation such as pushing of a button is made through contact to the touch screen as in conventional cases. Therefore, this technique is still insufficient in operability and the problem of occurrence of an erroneous manipulation is not solved satisfactorily. Furthermore, since a proximity manipulation and a contact manipulation are performed simultaneously, the advantages of the proximity manipulation are not exercised fully.

SUMMARY

An object of the present invention is to provide a display apparatus, a display method, and a display program which can enhance the operability of a proximity manipulation while reducing the probability of occurrence of an erroneous manipulation.

A display apparatus according to the invention comprises a display unit configured to display a target item; a sensor unit configured to detect a commanding medium which is placed close to the display unit; and a proximity manipulation determination unit configured to judge a target item that corresponds to a closed figure formed by a movement locus of the commanding medium detected by the sensor unit, and determining whether a prescribed manipulation is performed for the target item.

For example, the display apparatus may further comprise a display processing unit configured to draw, on the display unit, a boundary line of the closed figure and a center coordinates point indicating center coordinates of the closed figure.

For example, if the closed figure has an area which is larger than or equal to a prescribed value, the proximity manipulation determination unit determines that the prescribed manipulation is performed for the target item.

For example, the display apparatus may be such that if a ratio of an area of an overlap between the closed figure and the target item to an area of the closed figure is larger than or equal to a prescribed value, the proximity manipulation determination unit determines that the prescribed manipulation is performed for the target item.

For example, if a shortest distance between a boundary line of the closed figure and center coordinates of the closed figure is larger than or equal to a prescribed value, the proximity manipulation determination unit determines that the prescribed manipulation is performed for the target item.

For example, if a difference between a longest distance and a shortest distance between a boundary line of the closed figure and center coordinates of the closed figure is smaller than or equal to a prescribed value and/or a ratio of the longest distance to the shortest distance is smaller than or equal to a prescribed value, the proximity manipulation determination unit determines that the prescribed manipulation is performed for the target item.

For example, if no target item that contains center coordinates of the closed figure exists on the display unit, the closed figure is moved to a position of a display item which is closest to the center coordinates of the closed figure.

For example, if no target item that contains center coordinates of the closed figure exists on the display unit and the sensor unit has detected an additional movement of the commanding medium, the closed figure is moved according to a locus of the additional movement.

For example, a kind of the prescribed manipulation is changed according to a shape of the closed figure.

For example, the closed figure is one of an approximately circular figure, an approximately triangular figure, and an approximately rectangular figure.

A portable terminal apparatus according to the invention comprises any of the above display apparatus.

A display apparatus according to another aspect of the invention comprises a display unit configured to display a target item; a sensor unit configured to detect a commanding medium which is placed close to the display unit; a coordinates acquiring unit configured to acquire sets of coordinates on the display unit that correspond to a movement locus of the commanding medium detected by the sensor unit, on the basis of the movement locus; a coordinates storage unit configured to store the sets of coordinates acquired by the coordinates acquiring unit; a figure judging unit configured to judge a closed figure that corresponds to the movement locus of the commanding medium on the basis of the sets of coordinates stored in the coordinates storage unit; a calculation unit configured to calculate center coordinates of the closed figure on the display unit; and a proximity manipulation determination unit for judging a target item containing the center coordinates of the closed figure on the display unit, and determining whether a prescribed manipulation should be performed for the target item.

A display method according to the invention comprises: displaying a target item on a display unit; detecting a commanding medium which is placed close to the display unit; judging a target item which corresponds to a closed figure formed by a detected movement locus of the commanding medium; and determining whether a prescribed manipulation is performed for the target item.

A display program according to the invention causes a computer to execute the steps of displaying a target item on a display unit; detecting a commanding medium which is placed close to the display unit; judging a target item which corresponds to a closed figure formed by a detected movement locus of the commanding medium; and determining whether a prescribed manipulation is performed for the target item.

According to the invention, since a prescribed manipulation such as pushing, reduction/enlargement, or deletion of a target item such as a button or an icon is performed automatically merely by a simple manipulation of drawing a closed figure, the operability is enhanced and manipulation methods may be broadened. Furthermore, since a manipulation can be made from a position that is distant from display items that are prone to be hidden by the commanding medium such as a finger, it is expected that the probability of occurrence of an erroneous manipulation is reduced and a target item can be manipulated more reliably. Still further, a target item displayed on the display unit whose display area is restricted (as in cellphones) is in many cases small, and it may be difficult to manipulate such a target item through contact. According to the invention, increased ease of operation may be attained because a target item can be selected reliably by merely drawing a closed figure by a proximity manipulation. In addition, the display unit can be manipulated without being stained even with a dirty hand.

BRIEF DESCRIPTION OF THE DRAWINGS

FIG. 2A is conceptual diagrams illustrating a specific procedure for drawing a closed figure on the display unit, and FIG. 2B is conceptual diagrams illustrating what purposes individual closed figures serve for.

FIGS. 7A-7E relate to an overlap area, the length of a closed figure, a movement locus, plural display items, and a disconnected movement locus, respectively.

FIG. 8A illustrates a method using vectors and FIG. 8B illustrates a method using a circumscribed rectangle.

FIGS. 9A and 9B illustrate other example methods for calculating center coordinates of a closed figure; FIG. 9A illustrates a method in which a point having the same distance from arbitrary three apices is calculated and FIG. 9B illustrates a method in which an area centroid is calculated.

FIGS. 15A-15D are conceptual diagrams illustrating an example flow of a manipulation and operations that are performed according to a third embodiment.

FIGS. 20A-20C are conceptual diagrams showing example kinds of closed figures that can be used in a fourth embodiment; FIGS. 20A-20C show a circle, a rectangle, and a triangle, respectively.

DETAILED DESCRIPTION OF EXEMPLARY EMBODIMENTS

Display apparatus according to embodiments of the present invention will be hereinafter described with reference to FIGS. 1 to 26.

Figure 1:
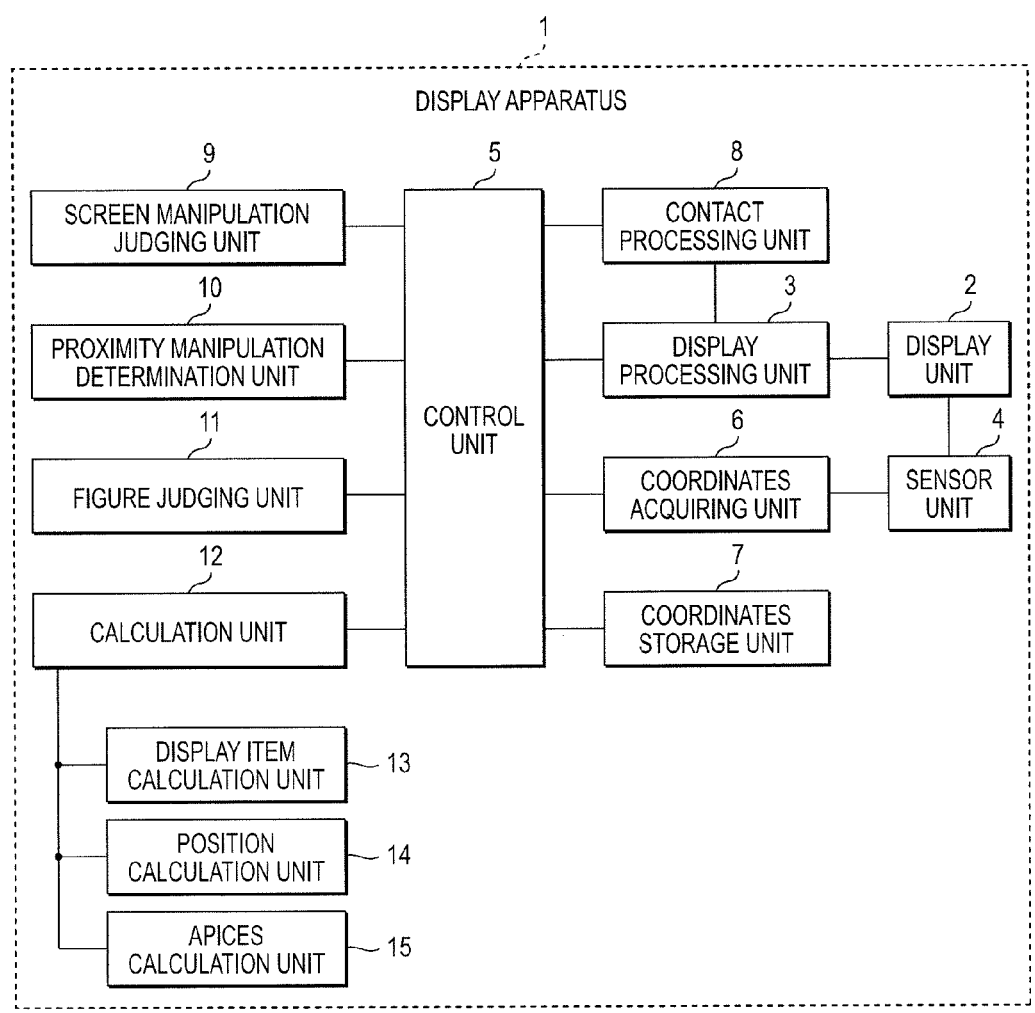
FIG. 1 is a block diagram showing the hardware configuration of a display apparatus according to the invention.

FIG. 1 is a block diagram showing the hardware configuration of a display apparatus according to the invention. The display apparatus according to the invention, which is a portable terminal such as a cellphone (e.g., smartphone), a tablet PC, or a portable measuring instrument, a portable notebook PC, a digital camera, or the like, is equipped with a display unit 2, a display processing unit 3 for controlling the display of the display unit 2, and a sensor unit 4. Equipped with a UI (user interface)-type display panel such as a liquid crystal panel or an organic EL panel, the display unit 2 detects a proximity (hovering) manipulation or a contact manipulation using a commanding medium 20 such as a finger or a stylus (described later) by means of a sensor unit 4 which is of a capacitance type, an infrared detection type, or the like. The display unit 1 is also equipped with a control unit 5, a coordinates acquiring unit 6, a coordinates storage unit 7, a contact processing unit 8, a screen manipulation judging unit 9, a proximity manipulation determination unit 10, a figure judging unit 11, and a calculation unit 12.

Having a microprocessor configuration including a CPU, a RAM, and a ROM, the control unit 5 controls the entire display apparatus 1 (performs calculation, search, extraction, etc.) according to control programs which are stored in the ROM and controls the execution of various processing functions (described later). The coordinates acquiring unit 6 acquires coordinates on the display unit (display panel) according to a movement (movement locus) of the commanding medium 20 detected by the sensor unit 4. The coordinates storage unit 7, which uses a recording medium that that is an optical recording medium (e.g., DVD (digital versatile disc)), a hard disk drive, or some other type of nonvolatile memory, stores coordinates acquired by the coordinates acquiring unit 6. The screen manipulation judging unit 9 judges whether a movement of the commanding medium 20 detected by the sensor unit 4 has been made from a position close to the display panel or made with contact to the display panel. A contact manipulation is handled by the contact processing unit 8. The proximity manipulation determination unit 10 decides on a target item 31 (described later) that contains center coordinates of a closed figure 40 (described later), and determines that a prescribed manipulation should be performed on the target item 31.

The figure judging unit 11 judges a shape of a closed figure 40 that corresponds to a movement locus of the commanding medium 20 on the basis of sets of coordinates stored in the coordinates storage unit 7. The calculation unit 12 calculates center coordinates O of the closed figure 40 on the basis of the sets of coordinates stored in the coordinates storage unit 7, and performs various calculations relating to the closed figure 40. In addition to the above-described various hardware units, the display apparatus 1 is equipped with a display item calculation unit 13, a position calculation unit 14, and an apex calculation unit 15. The display item calculation unit 13 calculates a distance between the center coordinates O of the closed figure 40 and a display item 30 (described later) closest to the former. The position calculation unit 14 calculates a distance between the center coordinates O of the closed figure 40 and a target item 31 to the position of which the closed figure 40 is desired to be moved. The apex calculation unit 15 calculates apices or angles formed by adjoining sets of coordinates for determining a shape of the closed figure 40.

Figure 2A:
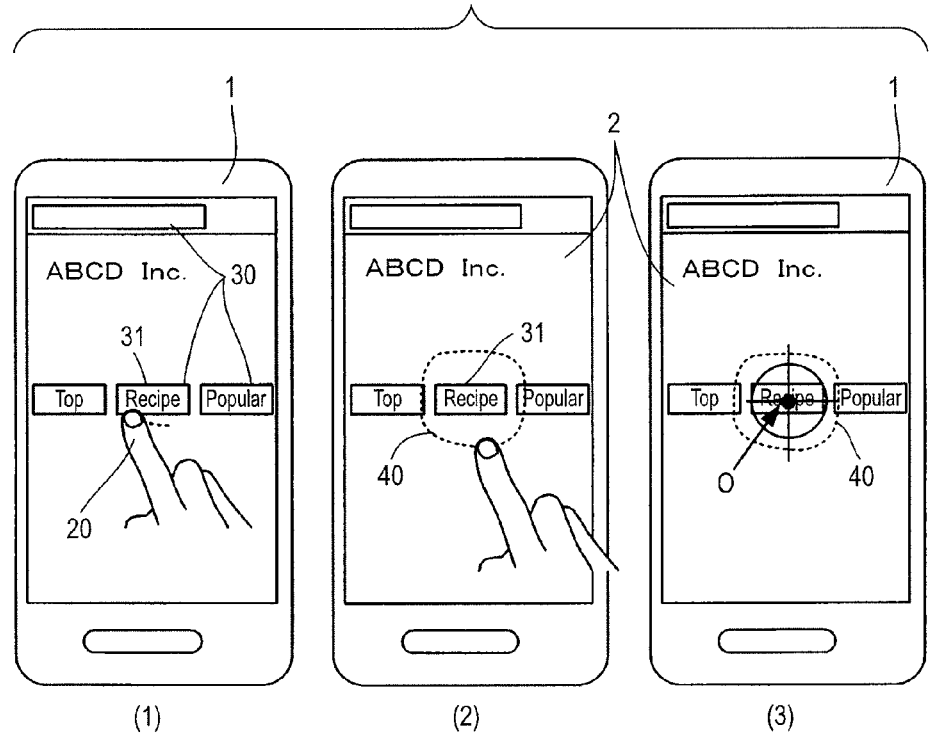
FIGS. 2A and 2B illustrate example manipulations performed on a display unit used in the invention.
Figure 2B:
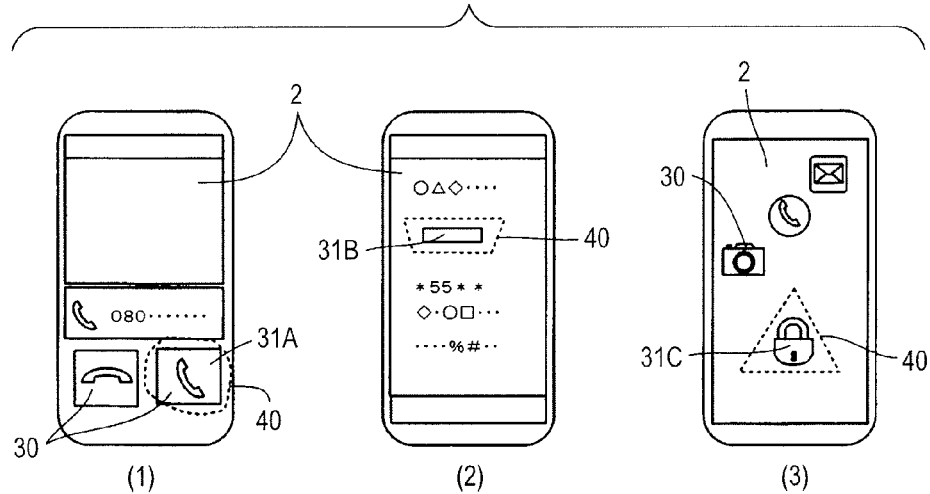
Figure 3A:
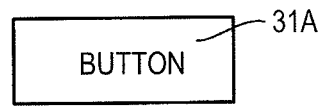
FIGS. 3A-3D are conceptual diagrams illustrating an example flow of a manipulation and operations that are performed according to a first embodiment.
Figure 3B:
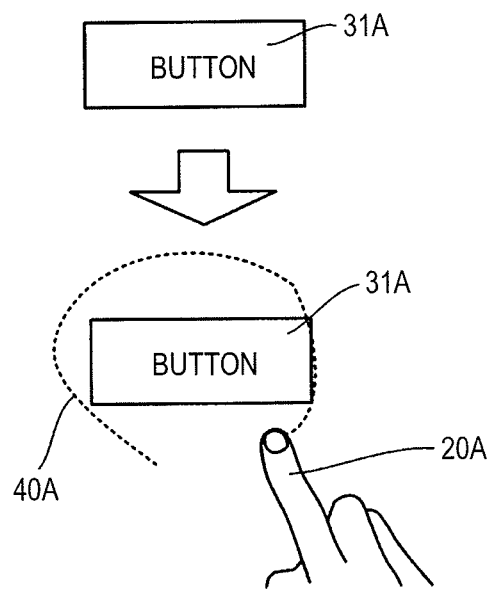
Figure 3C:
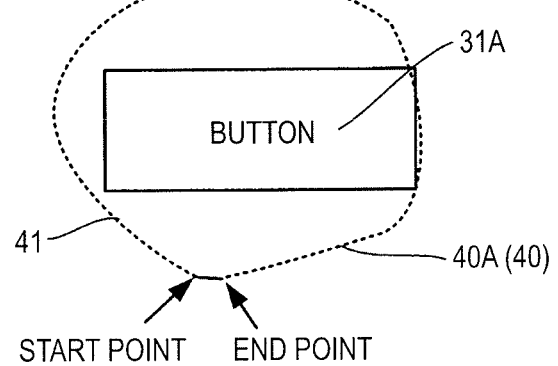
Figure 3D:
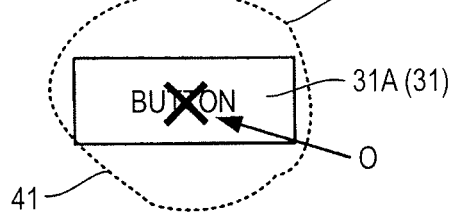

FIGS. 2A and 2B are conceptual diagrams illustrating example manipulations performed on the display unit 2 used in the invention. FIG. 2A illustrates a specific procedure for drawing a closed figure on the display unit 2, and FIG. 2B illustrates what purposes individual closed figures serve for.

The user brings the commanding medium 20 such as a finger or a stylus close to the display unit 2, and draws a figure so that it encloses a target item 31 among plural display items 30 being displayed on the display unit 2. In this example, the user selects a display item 30 named "Recipe" as a target item 31 and draws a circle around it (see FIG. 2A(1)). A movement (movement locus) of the commanding medium 20 is detected by the sensor unit 4, and plural sets of coordinates are acquired by the coordinates acquiring unit 6 on the basis of the detected movement locus. A figure thus drawn (completed) is a closed figure 40. In this example, a circular closed figure 40 is drawn (see FIG. 2A(2)). The calculation unit 12 calculates center coordinates O of the closed figure 40, and the proximity manipulation determination unit 10 judges that the display item 30 containing the center coordinates O is a target item 31, whereupon the recipe button thus judged to be the target item 31 is automatically pushed down (see FIG. 2A(3)). As described above using the series of finger movements/operations shown in FIG. 2A, a manipulation on a target item 31 such as a button is performed automatically by the user's merely drawing a closed figure 40 by a proximity manipulation instead of manipulating the target item 31 by directly touching it with a finger or the like.

The proximity (hovering) manipulation means a manipulation of bringing the commanding medium 20 close to the display unit 2 from above and moving the commanding medium 20 in a space that is distant from the surface of the display unit 2. The display item 30 as mentioned above means is any of various displays made on the display unit 2, such as an icon for manipulating an application, a button for, for example, an on/off manipulation, an input box to which a search key, a name, or the like is to be input, a manipulation bar, an image (e.g., photograph), or a display indicating an application, a gadget, a browser, or the like. The target item 31 means a display item 30 on which the user wants to make a certain manipulation. Since a certain manipulation on the target item 31 located at a position corresponding to a closed figure 40 is performed automatically in response to an event (signal) that is output from the proximity manipulation determination unit 10, this is defined as "determination of execution of a prescribed manipulation." The prescribed manipulation means pushing of an icon, a button, or the like, enlargement, reduction, or scrolling of an image or a retrieved picture, switching between gadgets, pasting or deletion of an icon or a button, or a like manipulation. The prescribed operation is similar to a tap, a flick, a pinch, or the like which is performed through contact to the screen of the display unit 2.

FIG. 2B illustrates example closed figures 40 and prescribed manipulations that are performed so as to correspond to the shapes of the respective closed figures 40. For example, in the example of FIG. 2B(1), a closed figure 40 is generally shaped like a circle and a button 31A which is a target item 31 for starting a call is pushed down automatically. In the example of FIG. 2B(2), a closed figure 40 is generally shaped like a rectangle and an input box 31B as a target item 31 is enlarged automatically. In the example of FIG. 2B(3), a closed figure 40 is generally shaped like a triangle and a security key 31C as a target item 31 is unlocked automatically. That is, the kind of a prescribed manipulation can be varied according to the shape of a closed figure 40.

FIGS. 3A-3D are conceptual diagrams illustrating an example manipulation and operations that are performed according to a first embodiment. In this example manipulation, an example commanding medium 20, target item 31, and closed figure 40 are a finger 20A, a button 31A, and a circle 40A, respectively. The button 31A is displayed on the display unit 2 (see FIG. 3A). The user selects a target item 31 from display items 30, and draws a circle 40A with the finger 40A so as to surround the button 31A (see FIG. 3B). As soon as the user has finished drawing the circle 40A, the calculation unit 12 calculates a distance between start point coordinates and end point coordinates. If the calculated distance is shorter than or equal to a prescribed value, the calculation unit 12 connects the start point and the end point by, for example, a graphic method and thereby completes the closed figure 40 (see FIG. 3C). The calculation unit 12 then calculates center coordinates O of the closed figure 40. The center coordinates point of the center coordinates O is indicated by mark "x" in FIG. 3D. The proximity manipulation determination unit 10 judges that the button 31A containing the center coordinates O is a target item 31, and decides on a command for pushing down the button 31A automatically.

The movement locus of the circle 40A drawn by the user may either start to be displayed on the display unit 2 by a solid line, broken line, or the like upon the start of its drawing or be displayed upon completion of its drawing. A boundary line 41 of the closed figure 40 and mark "x" indicating the center coordinates O of the closed figure 40 are processed by the display processing unit 3 in response to an event that is supplied from the proximity manipulation determination unit 10, and are drawn on the display unit 2. When a prescribed manipulation of, for example, pushing down a target item 31 is made, it may be either changed in color or into a 3D shape to allow the user to visually recognize that the manipulation has been made on the display unit 2. For example, sets of coordinates which are acquired by the coordinates acquiring unit 6 may be either acquired by following a locus of the commanding medium 20 by means of plural transparent electrodes provided in matrix form in the sensor unit 4 or acquired at a constant rate or every constant distance by means of a speed sensor, an acceleration sensor, or the like for detecting a movement of the commanding medium 20.

Figure 4:
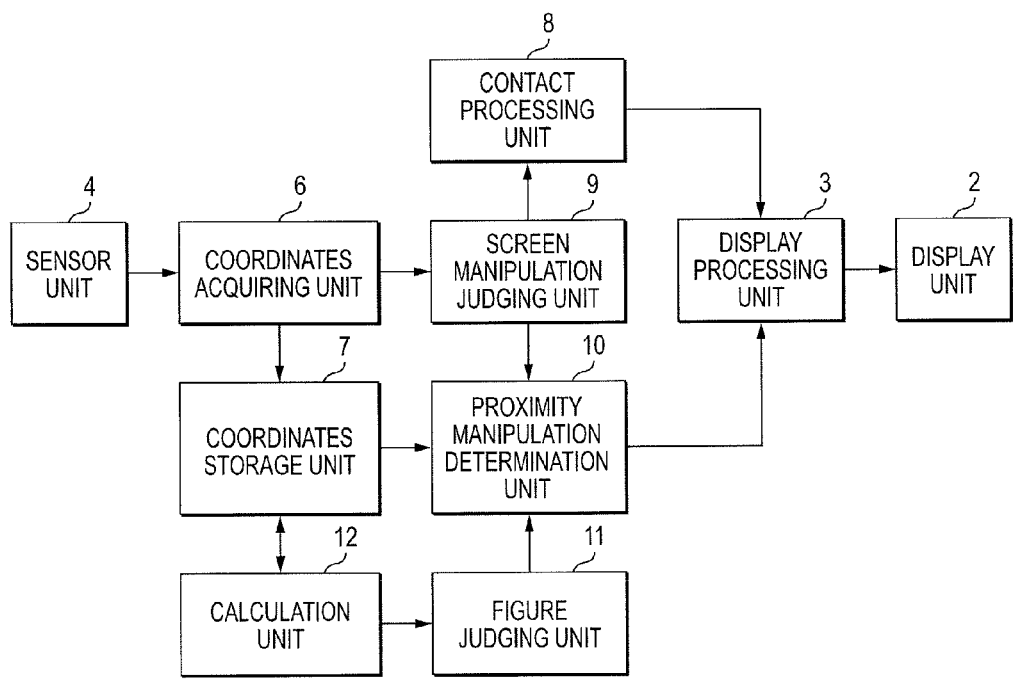
FIG. 4 is a block diagram showing an example processing flow of the hardware of the first embodiment.

FIG. 4 is a block diagram showing an example processing flow of the hardware of the first embodiment. The coordinates acquiring unit 7 acquires sets of coordinates on the basis of a movement locus of the commanding medium 20 detected by the sensor unit 4, and the coordinates storage unit 8 stores the acquired sets of coordinates. The screen manipulation judging unit 9 judges whether the movement of the commanding medium 20 detected by the sensor unit 4 is of a proximity manipulation or a contact manipulation. If it is of a contact manipulation, the contact processing unit 8 handles it. The calculation unit 12 calculates center coordinates O of a closed figure 40 on the basis of the sets of coordinates of the movement locus stored in the coordinates acquiring unit 7. The figure judging unit 11 judges a shape of the closed figure 40 on the basis of positional relationships between the sets of coordinates stored in the coordinates acquiring unit 7. The proximity manipulation determination unit 10 refers to past coordinate data stored in the figure judging unit 11 and the coordinates acquiring unit 7, and supplies an event to the effect that execution of a prescribed manipulation has been determined to the display processing unit 3 and the control unit 5 on the basis of proximity manipulation information received from the screen manipulation judging unit 9. The display processing unit 3 draws a boundary line 41 of the closed figure 40 and a center coordinates point indicating the center coordinates O of the closed figure 40.

The judgment speed and accuracy of the proximity manipulation determination unit 10 can be increased by storing, in the coordinates acquiring unit 7, sets of coordinates of closed figures 40 drawn in the past for prescribed manipulations on target items 31 because past prescribed manipulations on target items 31 and closed figures 40 can be referred to as reference data. A threshold value may be set for the area of a closed figure 40 because the user may draw a large closed figure 40 so as to enclose a display item 30 near a target item 31 or, conversely, draw a closed figure 40 that is smaller than the display size of a target item 31. The proximity manipulation determination unit 10 may be allowed to determine that a prescribed manipulation should be performed on a target item 31 if, for example, an area calculated by the calculation unit 12 is larger than or equal to a prescribed value. Or the proximity manipulation determination unit 10 may be allowed to determine that a prescribed manipulation should be performed on a target item 31 if the shortest distance between the boundary line 41 of a closed figure 40 and its center coordinates O is larger than or equal to a prescribed value. The shortest distance is employed because in the case of a polygonal closed figure 40 the distance between each point on a side and the center coordinates O is not constant. Setting a threshold value for the area or distance can reduce the probability of occurrence of an erroneous manipulation. Other methods for determining that a prescribed manipulation should be performed will be described later with reference to FIGS. 7A-7E.

Figure 5:
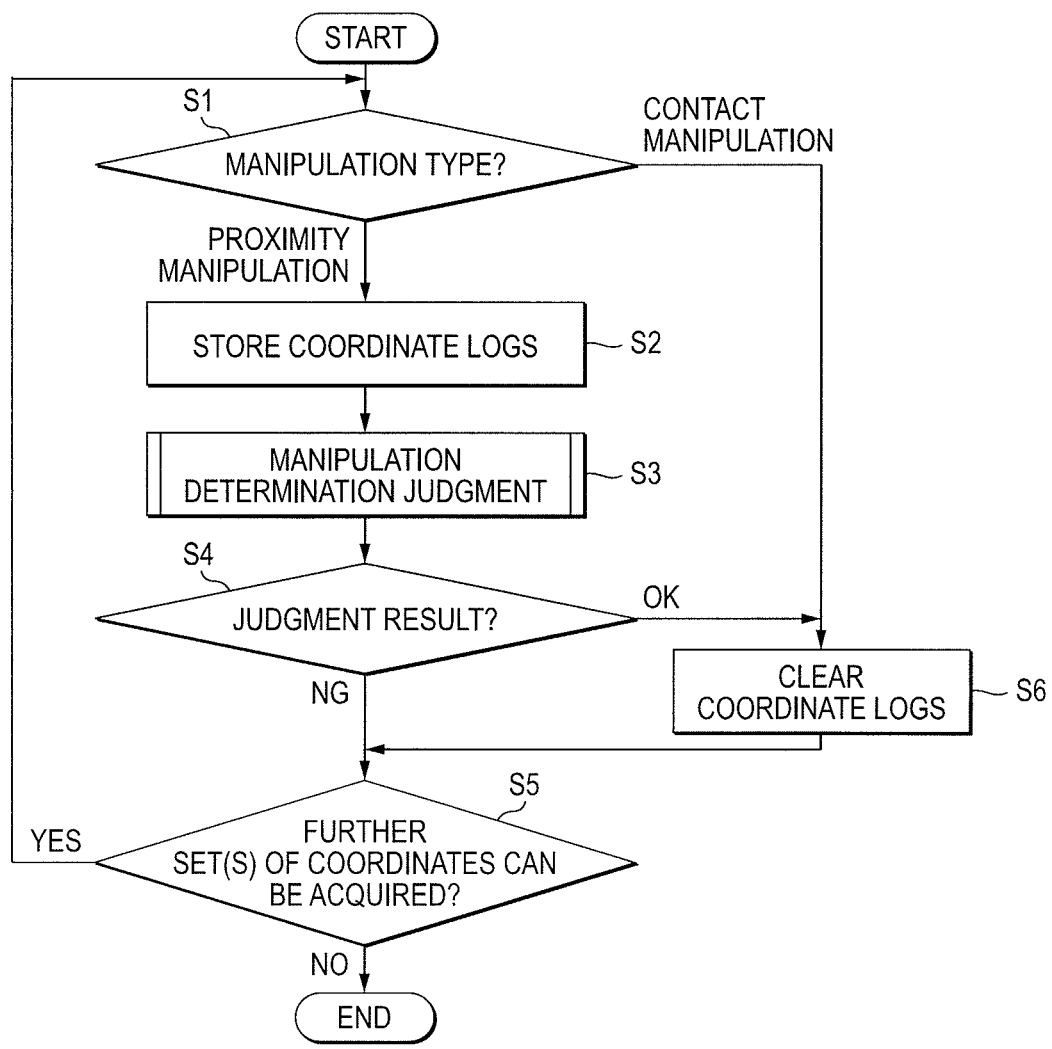
FIG. 5 is a flowchart of an example overall process according to the first embodiment.

FIG. 5 is a flowchart of an example overall process according to the first embodiment. First, at step S1, the screen manipulation judging unit 9 judges whether a manipulation detected by the sensor unit 4 is a proximity manipulation or a contact manipulation. If the screen manipulation judging unit 9 judges that the detected manipulation is a proximity manipulation (S1: proximity manipulation), at step S2 sets of coordinates (coordinate logs) acquired by the coordinates acquiring unit 6 are stored. At step S3, the proximity manipulation determination unit 10 executes a manipulation determination judgment process, which will be described later with reference to FIG. 6. If the manipulation determination judgment process produces a judgment result to the effect that execution of the manipulation cannot be determined (S4: NG), it is judged at step S5 whether a further set(s) of coordinates can be acquired or not. If it is judged that a further set(s) of coordinates can be acquired (S5: yes), the process returns to step S1. If it is judged that no further set of coordinates can be acquired (S5: no), the process is finished.

If the screen manipulation judging unit 9 judges that the detected manipulation is a contact manipulation (S1: contact manipulation) or the proximity manipulation determination unit 10 judges that execution of the manipulation should be determined (S4: OK), at step S6 the coordinate logs are cleared (the manipulation (contact manipulation or proximity manipulation) has already been performed). If it is judged that a further set(s) of coordinates can be acquired (S5: yes), the process returns to step S1. If it is judged that no further set of coordinates can be acquired (S5: no), the process is finished.

Figure 6:
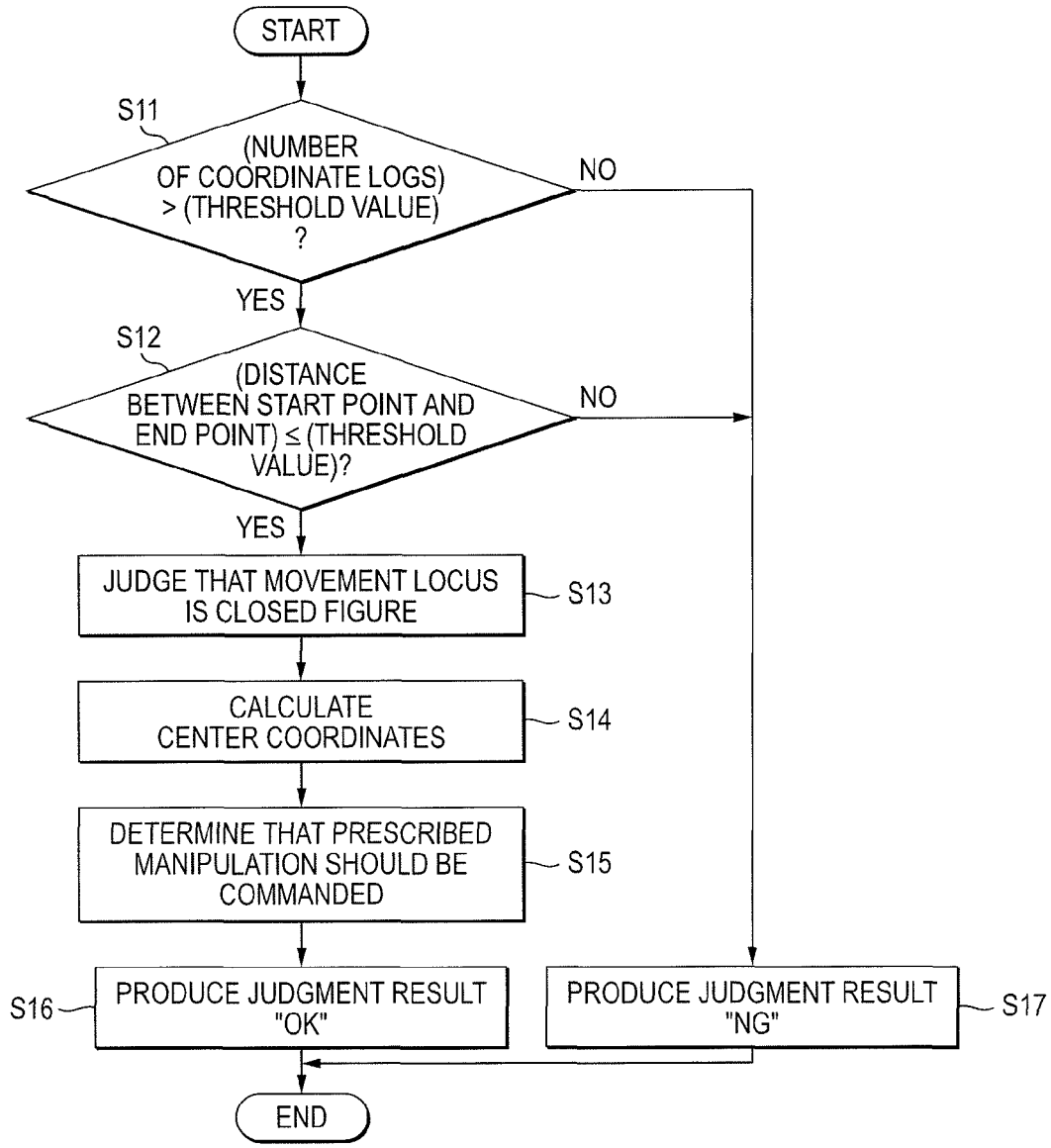
FIG. 6 is a flowchart of an example of a manipulation determination judgment process shown in FIG. 5.

FIG. 6 is a flowchart of an example of the manipulation determination judgment process (step S3) shown in FIG. 5. At the manipulation determination judgment step S3, first, at step S11, the coordinates acquiring unit 6 compares the number of coordinate logs with a threshold value. It is necessary to set, in advance, a limit value of the number of coordinate logs to be used for judging a shape of a closed figure 40. Since the user makes various manipulations on the display screen of the display unit 2, every proximity manipulation does not always produce a closed figure 40. Whether or not a closed figure 40 has been drawn by a user manipulation can be judged by setting a lower limit of the number of coordinate logs that are acquired on the basis of a movement locus of the commanding medium 20 used for manipulating a target item 31. The lower limit of the number of coordinate logs for judging whether a closed figure 40 has been drawn or not may be varied according to the display size of a target item 31 or the shape of a closed figure 40. An upper limit value may be set instead of a lower limit value.

If the coordinates acquiring unit 6 judges that the number of coordinate logs is larger than the threshold value (S11: yes), at step S12 the calculation unit 12 calculates a distance between a start point and an end point. A distance between a start point and an end point need not always be calculated; a distance between a latest point and a point, closest to the latest point, of a past locus. If the calculation unit 12 judges that the distance between the start point and the end point is smaller than a threshold value (S12: yes), at step S13 the figure judging unit 11 judges that the movement locus is a closed figure 40.

Whereas a complete circle, triangle, quadrilateral, etc. on a two-dimensional plane can be expressed as a continuous line segment, a figure as a movement locus of the commanding medium 20 manipulated by the user seldom has a start point and an end point that coincide with each other. In this embodiment, if the distance between a start point and an end point is within the prescribed threshold value, they are regarded as approximately coinciding with each other and figure closing processing is performed. Therefore, a figure drawn by the user with the commanding medium 20 is called a "closed figure 40" rather than a "figure." A "closed figure 40" need not be closed completely, and it suffices that a "closed figure 40" be able to be recognized and processed by the figure judging unit 11. It may be judged that a closed figure 40 has been completed when it has crossed itself rather than when it has produced (a start point and) an end point. The first embodiment is directed to a case that a circle is drawn as a closed figure 40. However, a circle that is drawn by the user is not a perfect circle, and it is like an ellipse if a target item 31 is a rectangular button, for example. Therefore, when a closed figure 40 is called a circle, it includes an approximately elliptical figure formed by a curved line. That is, the terms "circle," "triangle," and "quadrilateral" that are used to describe closed figures 40 mean an approximately circular, triangular, and quadrilateral figures, respectively.

At step S14, the calculation unit 12 calculates center coordinates O of the closed figure 40. At step S15, the proximity manipulation determination unit 10 determines a target item 31 corresponding to the closed figure 40 that is the movement locus of the commanding medium 20 detected by the sensor unit 4 and also determines that a prescribed manipulation (e.g., automatic pushing of the button 31A) should be commanded for the target item 31. At step S16, the prescribed manipulation is performed and a judgment result "OK" is produced. To simplify the control, the prescribed manipulation may be commanded and performed without determining a target item 31. If the number of coordinate logs is smaller than or equal to the threshold value (S1: no) or the distance between the start point and the end point is larger than the threshold value (S2: no), a judgment result "NG" is produced at step S17. The judgment result "OK" (step S16) or "NG" (step S17) are reflected in the judgment result of step S4 shown in FIG. 5.

FIGS. 7A-7E are conceptual diagrams illustrating example relationships between closed figures 40 drawn by the user and manipulation determination judgments. FIGS. 7A-7E relate to an overlap area, the length of a closed figure 40, a movement locus, plural display items 30, and a disconnected movement locus, respectively.

The user makes various manipulations on the display unit 2, and may draw a figure having an extreme shape in the case where the commanding medium 20 is a finger. A closed figure 40 can be judged reliably and the probability of occurrence of an erroneous manipulation is thus reduced by setting ranges where it should be judged that a closed figure 40 has been drawn properly by a proximity manipulation.

Figure 7A:
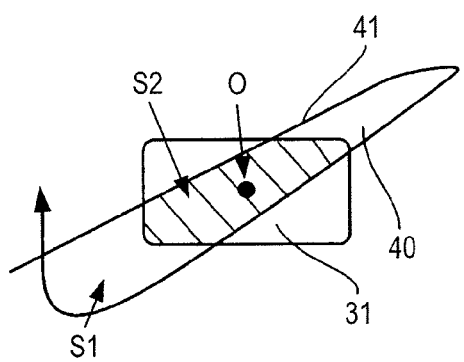
FIGS. 7A-7E are conceptual diagrams illustrating example relationships between closed figures drawn by the user and manipulation determination judgments.

Case 1: Overlap Area Ratio (FIG. 7A)

Symbols S1 and S2 represent the area of a closed figure 40 and the area of an overlap region between the closed figure 40 and a target item 31, respectively. Even if the target item 31 such as a button contains the center coordinates O of the closed figure 40, it is judged that the user does not intend to manipulate the target item 31 by drawing the closed figure 40 if the ratio of the area S2 of the overlap region to the area S1 of the closed figure 40, an overlap area ratio S2/S1, is smaller than or equal to a threshold value (e.g., 30%). If such a judgment is made, the proximity manipulation determination unit 10 does not determine that a prescribed manipulation should be performed on the target item 31.

Figure 7B:
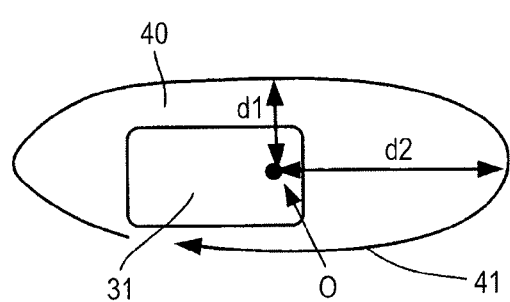

Case 2: Aspect Ratio (FIG. 7B)

Symbols d1 and d2 represent a shortest distance and a longest distance between the center coordinates O of a closed figure 40 and its boundary line 41, respectively. Distances d1 and d2 are obtained by calculating distances between the center coordinates O and individual acquired sets of coordinates of the closed figure 40. Let D1 and D2 represent the difference between the distances d2 and d1 (d2−d1) and the ratio between the distances d2 and d1 (d2/d1), respectively. If D1 is larger than or equal to a prescribed value and/or D2 is larger than or equal to a prescribed value, the proximity manipulation determination unit 10 does not determine that a prescribed manipulation should be performed on a target item 31. Similar processing can be performed on the closed figure 40 of case 1. In other words, in each of cases 1 and 2, the proximity manipulation determination unit 10 does not determine that a prescribed manipulation should be performed on a target item 31 if a closed figure 40 is so distorted that the difference between d2 and d1 is too large.

Case 3: Extreme Change in Movement Locus (FIG. 7C)

Figure 7C:
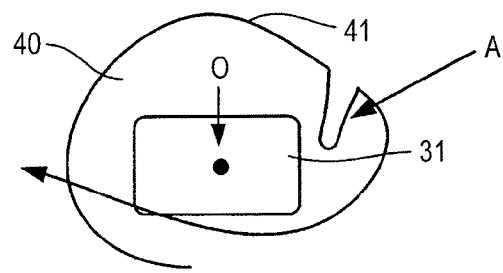

The display apparatus 1 may be configured so as to abstain from judging a resulting figure to be a closed figure 40 if a proximity manipulation of the user has fluctuated to cause an extreme change in the direction of a movement locus (indicated by arrow A in FIG. 7C).

Figure 7D:
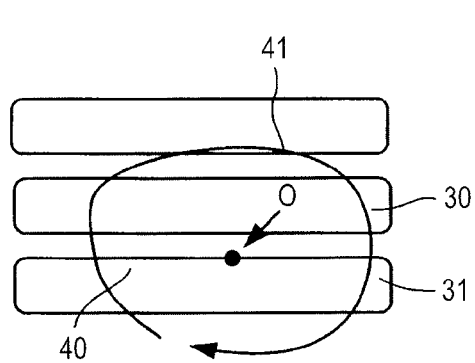

Case 4: Presence of Plural Display Items (FIG. 7D)

Where plural display items 30 exist around a target item 31, there may occur a case that a closed figure 40 surrounds (part of) a display item 30 other than a target item 31. Since a display item 30 containing the center coordinates O is not always an intended target item 31, in this case the proximity manipulation determination unit 10 may abstain from outputting an event to the effect that a prescribed manipulation should be performed. And the proximity manipulation determination unit 10 may urge the user to make a confirmation manipulation for specifying which display item 30 is an intended target item 31.

Figure 7E:
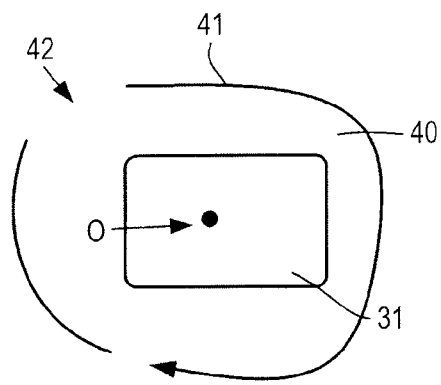

Case 5: Disconnected Movement Locus (FIG. 7E)

If a proximity manipulation of the user using the commanding medium 20 temporarily goes out of the detection range of the sensor unit 4 (e.g., goes upward or sideways excessively), a disconnection 42 may occur in a movement locus. If an additional movement locus is detected within a prescribed time or distance, the proximity manipulation determination unit 10 may judge that they constitute a single movement locus and a closed figure 40 has thereby been drawn.

Drawing a closed figure 40 by a proximity manipulation makes it possible to manipulate the display unit 2 without touching its display surface (touch panel surface), as a result of which the display surface is less prone to be stained or left with fingerprints. Loci that relate to security information such as a passcode are prevented from being read, which means increase in safety. The display unit 2 can be manipulated even with a dirty hand. Since a prescribed manipulation such as pushing, reduction/enlargement, or deletion of a target item 31 such as a button or an icon is performed automatically merely by a manipulation of drawing a closed figure 40, a vision-dominated manipulation is enabled and manipulation methods may be broadened. Furthermore, since a manipulation can be made from a position that is distant from display items 30 that are prone to be hidden by the commanding medium 20 such as a finger, the probability of occurrence of an erroneous manipulation is reduced and a target item 31 can be manipulated reliably. Still further, a target item 31 displayed on the display unit 2 whose display area is restricted (as in cellphones) is in many cases small, and it may be difficult to manipulate such a target item through contact. According to the embodiment, increased ease of operation may be attained because a target item 31 can be selected reliably by merely drawing a closed figure 40 by a proximity manipulation.

FIGS. 8A and 8B and FIGS. 9A and 9B illustrate example methods for calculating center coordinates O of a closed figure. Each of FIGS. 8A and 8B and FIGS. 9A and 9B show polygonal closed figures, that is, a triangle, a quadrilateral, and a pentagon (left to right in each figure).

Figure 8A:
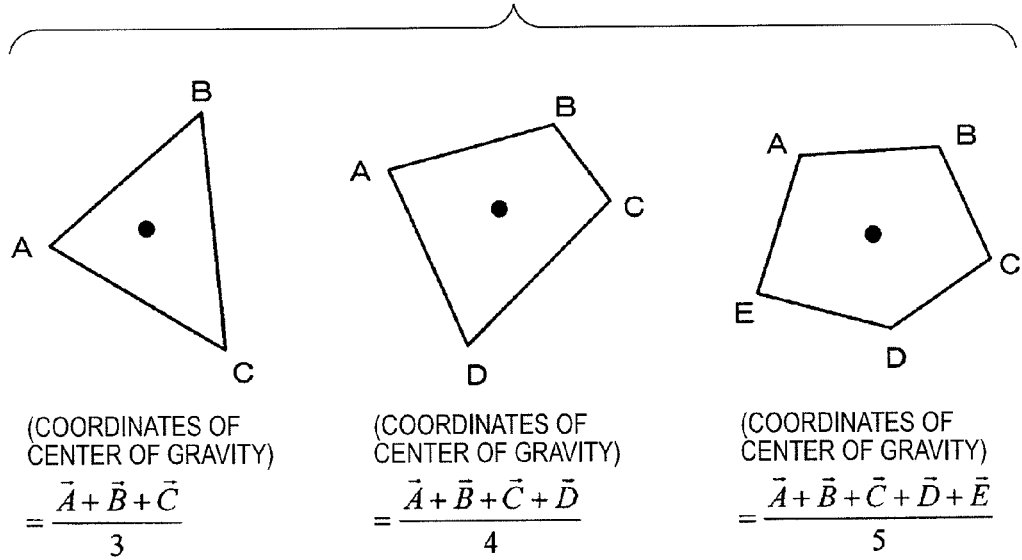
FIGS. 8A and 8B illustrate example methods for calculating center coordinates of a closed figure.
Figure 8B:
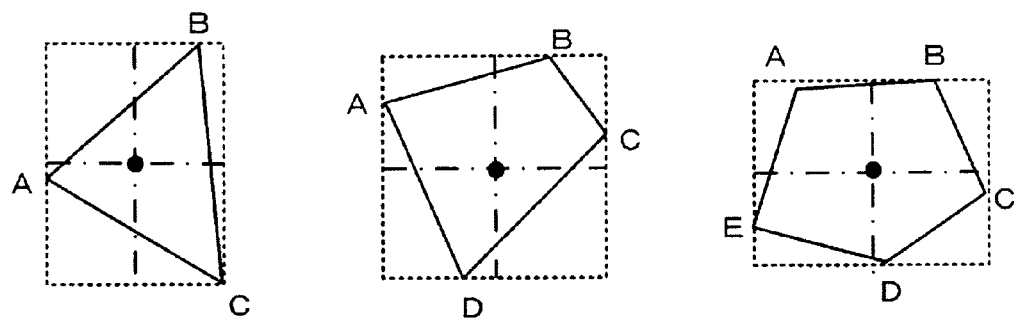

FIG. 8A illustrates a method for calculating the center of gravity of each figure by dividing the sum of the edge vectors (position vectors of the apices) by the number of edges. For example, the center of gravity of a triangle is calculated according to the formula (vector A+vector B+vector C)/3. FIG. 8B illustrates a method in which the center of a circumscribed rectangle of each figure. The center of a circumscribed rectangle is the intersecting point of line segments passing through the centers of its respective sides.

FIG. 9A illustrates a method in which the center of each figure is defined as a point having the same distance from arbitrary three apices. FIG. 9B illustrates a method in which an area centroid is calculated. As described in text form in FIG. 9B, a geometric centroid is calculated like a physical center of gravity with an assumption that the sides or apices have weights. Another method is as follows. The center of gravity of a triangle is the intersecting point of its medians (each of which is the line segment connecting an apex and the center of the side opposed to it). The center of gravity of a quadrilateral is calculated by averaging the centers of gravity of two constituent triangles using their areas as weights. The center of gravity of a polygon the number of whose apices is larger than or equal to five is calculated by repeatedly calculating the center of gravity of a triangle whose apices are the centers of gravity of constituent triangles.

Although the several methods for calculating center coordinates O of polygons have been described above, the method for calculating center coordinates O of a polygon is not limited to them. Furthermore, there are various methods for calculating center coordinates O of a circle, one of which may be selected according to the accuracy of calculation of center coordinates O and the performance of the control unit 5. An example method is as follows. The center of a line segment connecting the middle point between the start point and the end point of a movement locus and its halfway point is calculated. Likewise, pairs of points are set so as to be sequentially deviated (e.g., at regular intervals) from the middle point between the start point and the end point and the halfway point along the movement locus and the centers of line segments each connecting one of the pairs of points are calculated. Center coordinates O are calculated through averaging, by the least squares method, or by a like method. For another example, the incenters or circumcenters of plural triangles each having arbitrary points on a movement locus are calculated and center coordinates O are calculated on the basis of the sets of coordinates of the calculated incenters or circumcenters. Center coordinates O calculated by each method are approximate coordinates. Since a center or a center of gravity is obtained depending on the shape of a closed figure 40 and the calculation method, the term "center coordinates O" includes the coordinates of a center and the coordinates of a center of gravity.

FIGS. 10A-10D are conceptual diagrams illustrating an example flow of a manipulation and operations that are performed according to a second embodiment. In the following description, units, steps, etc. having the same ones in the first embodiment will be given the same reference symbols as the latter and will be described only briefly or will not be described at all. Differences from the first embodiment will be described in detail. The second embodiment is different from the first embodiment in that a closed figure 40 is automatically moved to an adjacent target item 31.

Figure 10A:
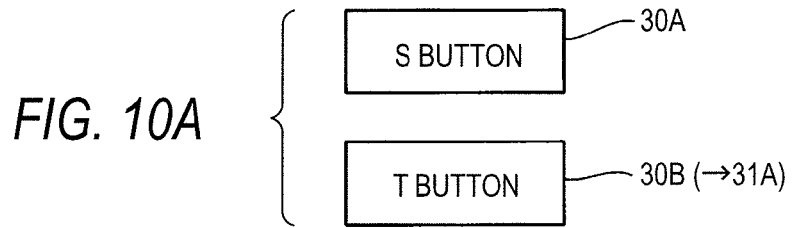
FIGS. 10A-10D are conceptual diagrams illustrating an example flow of a manipulation and operations that are performed according to a second embodiment.
Figure 10B:
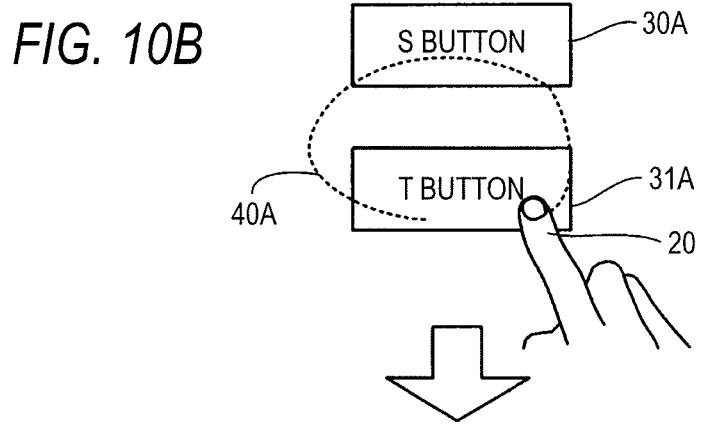
Figure 10C:
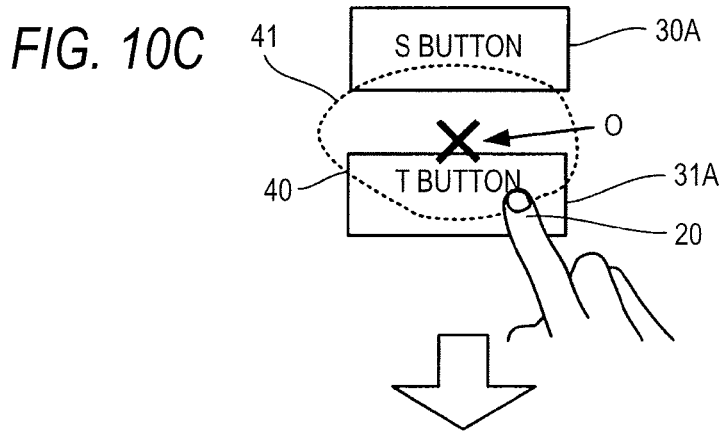
Figure 10D:
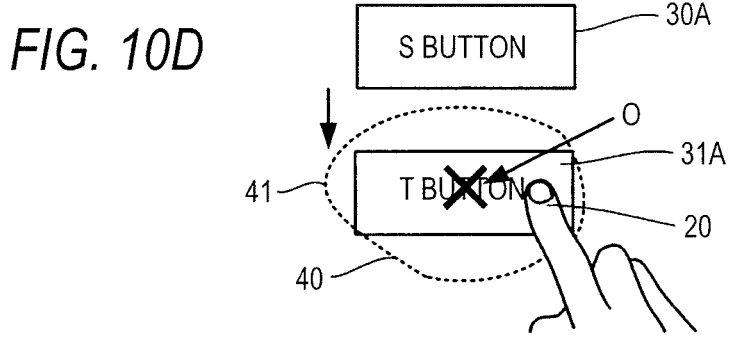

Plural display items 30 are displayed adjacent to each other on the display unit 2. In this example, an S button 30A and a T button 30B are displayed. The user selects the T button 30B as a target button 31A he or she wants to manipulate (see FIG. 10A). The user draws a circle 40A so as to surround the T button 31A (FIG. 10B). When the figure judging unit 11 judges the circle 40A to be a closed figure 40, the calculation unit 12 calculates center coordinates O of the closed figure 40 and causes the closed figure 40 and mark "x" indicating the center coordinates O to be displayed on the display unit 2 (see FIG. 10O). In this example, the center coordinates O are not located in the T button 31A. If there exists no display item 30 containing the center coordinates O, the proximity manipulation determination unit 10 judges that a display item 30 that is closest to the center coordinates O is a target item 31, causes the closed figure 40 to move to the target item 31 (in this example, T button 31A), and has the T button 31A pushed down (see FIG. 10D).

Figure 11:
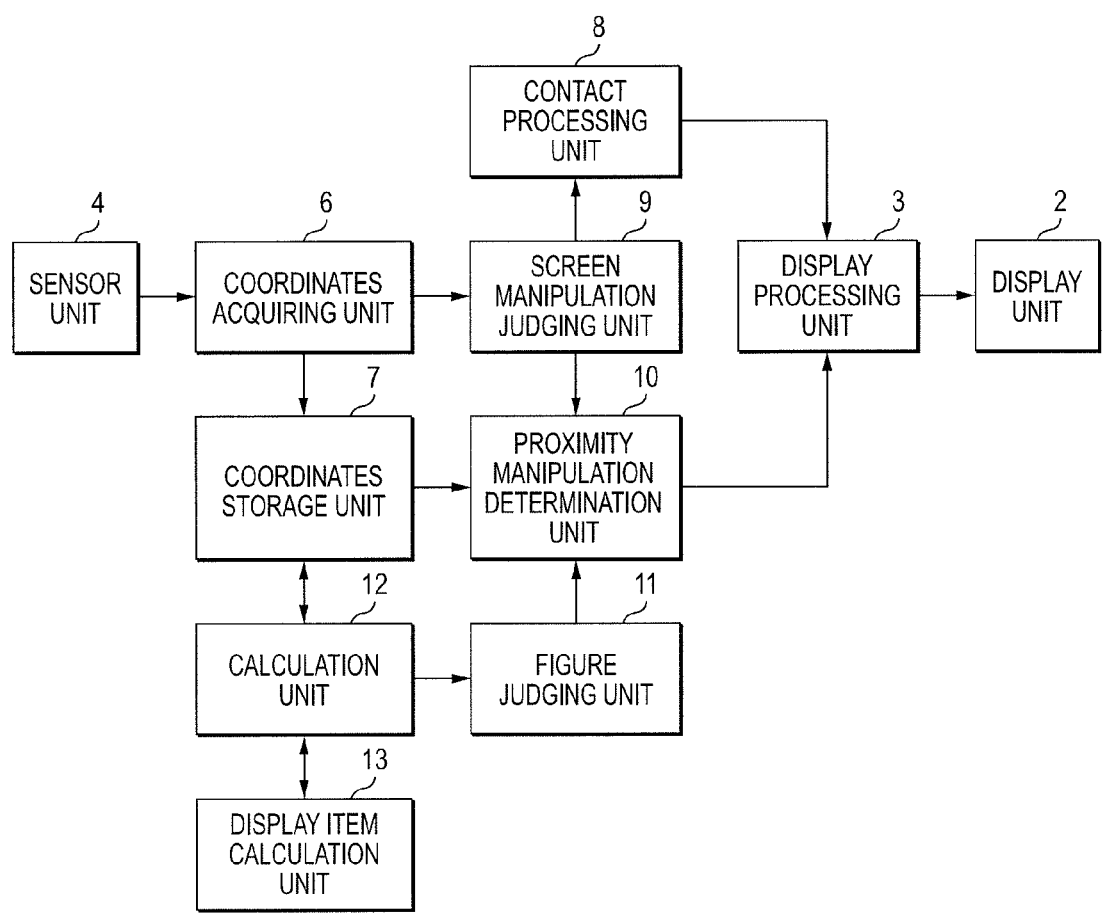
FIG. 11 is a block diagram showing an example processing flow of the hardware of the second embodiment.

FIG. 11 is a block diagram showing an example processing flow of the hardware of the second embodiment. This processing flow is different than in the first embodiment in that a display item calculation unit 13 is added.

The display item calculation unit 13 calculates a distance between center coordinates O of a closed figure 40 and center coordinates, for example, of the T button 31A. That is, the display item calculation unit 13 calculates a distance by which the closed figure 40 should be moved. The display item calculation unit 13 recognizes, as a close target, a display item 30 whose center coordinates are closest to the center coordinates O of the closed figure 40, and calculates a distance between its center coordinates and the center coordinates O of the closed figure 40 as a movement distance of the closed figure 40. The proximity manipulation determination unit 10 supplies the display processing unit 3 and the control unit 5 with an event to the effect that a prescribed should be commanded on the basis of data and information received from the figure judging unit 11, the coordinates storage unit 7, and the screen manipulation judging unit 9 as well as the distance information received from the display item calculation unit 13. The display processing unit 3 draws a boundary line 41 of the closed figure 40 and a center coordinates point indicating its center coordinates O on the display unit 2.

Figure 12:
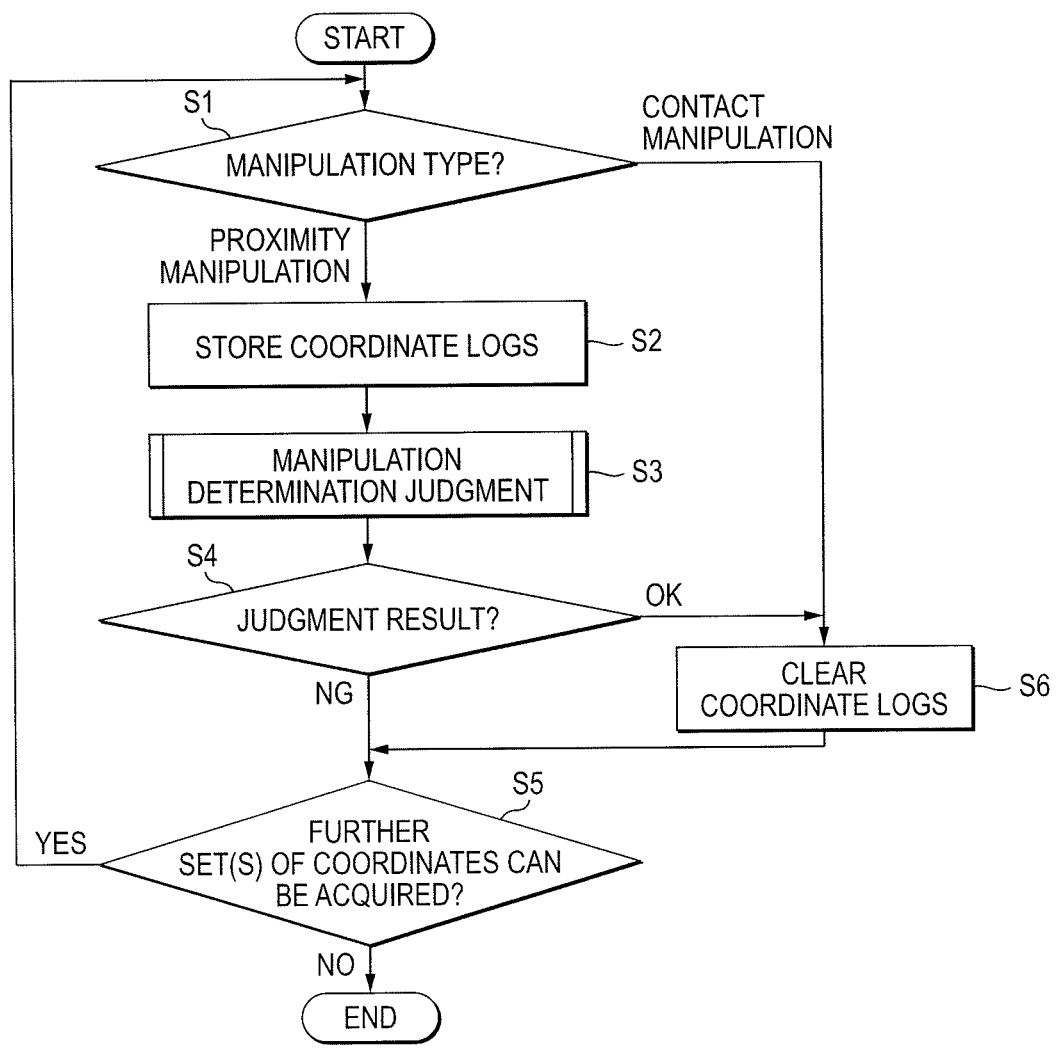
FIG. 12 is a flowchart of an example overall process according to the second embodiment.
Figure 13:
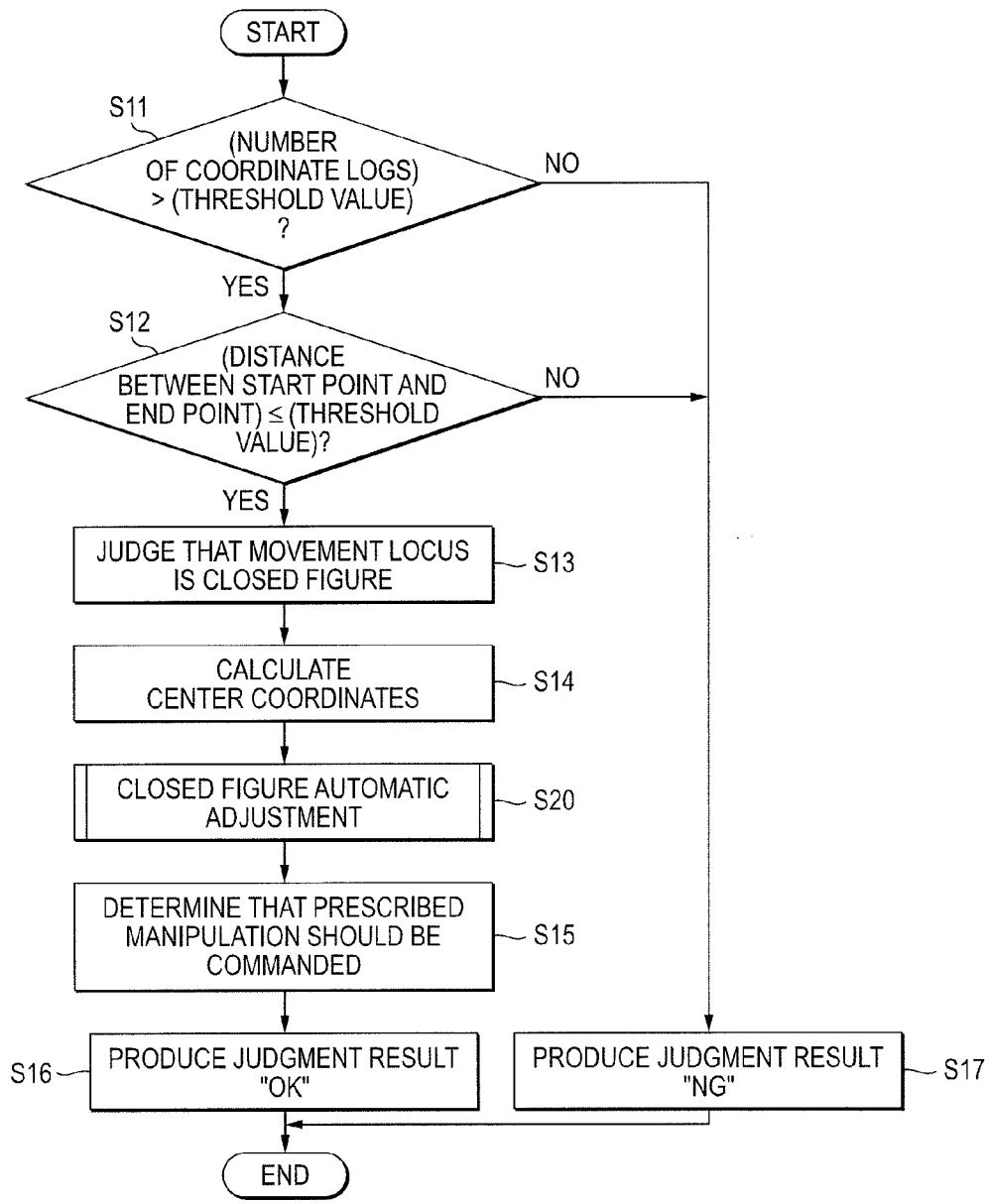
FIG. 13 is a flowchart of an example of a manipulation determination judgment process shown in FIG. 12.
Figure 14:
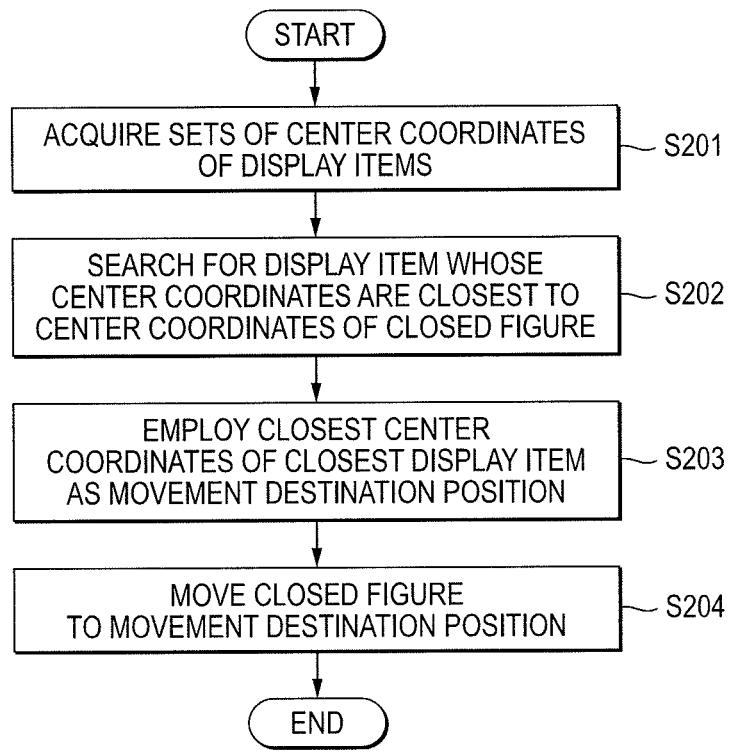
FIG. 14 is a flowchart of an example of a closed figure automatic adjustment-type process shown in FIG. 13.

FIGS. 12-14 are flowcharts of processes according to the second embodiment. FIG. 12 is a flowchart of an example overall process according to the second embodiment, which is the same as in the first embodiment and hence will not be described. FIG. 13 is a flowchart of an example of a manipulation determination judgment process shown in FIG. 12. This manipulation determination judgment process is different than in the first embodiment in that step S20 (closed figure automatic adjustment) is added between step S14 (calculation of center coordinates) and step S15 (determining that a prescribed manipulation should be commanded). FIG. 14 is a flowchart of an example of the closed figure automatic adjustment process (step S20) shown in FIG. 13.

Referring to FIG. 14, at step S201, the coordinates acquiring unit 6 acquires sets of center coordinates of display items 30. At step S202, the display item calculation unit 13 calculates distances between center coordinates O of a closed figure 40 and sets of center coordinates of display items 30 around the closed figure 40, respectively, and searches for a display item 30 whose center coordinates are closest to the center coordinates O of the closed figure 40. At step S203, the display item calculation unit 13 judges that the closest display item 30 is a target item 31 and employs the center coordinates of the target item 31 as a movement destination position of the closed figure 40. At step S204, the proximity manipulation determination unit 10 causes the closed figure 40 to move to the position of the target item 31 so that the center coordinates O of the closed figure 40 coincide with the center coordinates of the target item 31. At the same time, the display processing unit 3 performs update processing so that the movement of the closed figure 40 can be recognized visually on the display unit 2.

In the above-described method, a target item 31 is searched for on the basis of distances between the center coordinates O of a closed figure 40 and sets of center coordinates of display items 30. It is also possible to check degrees of overlap between plural sets of coordinates inside a closed figure 40 and plural sets of coordinates inside each display item 30 and select, as a target item 31, a display item 30 having a highest degree of overlap.

There may occur an event that a closed figure 40 drawn by the user does not enclose a target item 31 correctly. In particular, such an event may occur in a case that plural display items 30 are located in the vicinity of a target item 31 or a displayed target item 31 is small. In this embodiment, the ease of operation of the user is enhanced by judging a deviation of a closed figure 40 from a target item 31 and moving the closed figure 40 to the position of the target item 31 automatically according to an algorithm, for example.

FIGS. 15A-15D are conceptual diagrams illustrating an example flow of a manipulation and operations that are performed according to a third embodiment. This embodiment is different from the second embodiment in that the user moves a closed figure 40 by himself or herself.

The user selects a button 31A as a target item 31, and draws a circle 40A so as to surround the button 31A and thereby complete a closed figure 40 (see FIGS. 15A-15C). If the center coordinates O of the closed figure 40 is not contained in the button 31A (see FIG. 15C), the proximity manipulation determination unit 10 does not determine that a prescribed manipulation should be performed. In this case, the user moves the closed figure 40 to the position of the target item 31 (indicated by an arrow in FIG. 15D) by making an additional proximity manipulation with a finger 20A. The closed figure 40 is moved so as to follow an additional movement locus of the commanding medium 20, and a prescribed manipulation is performed for the target item 31.

Figure 16:
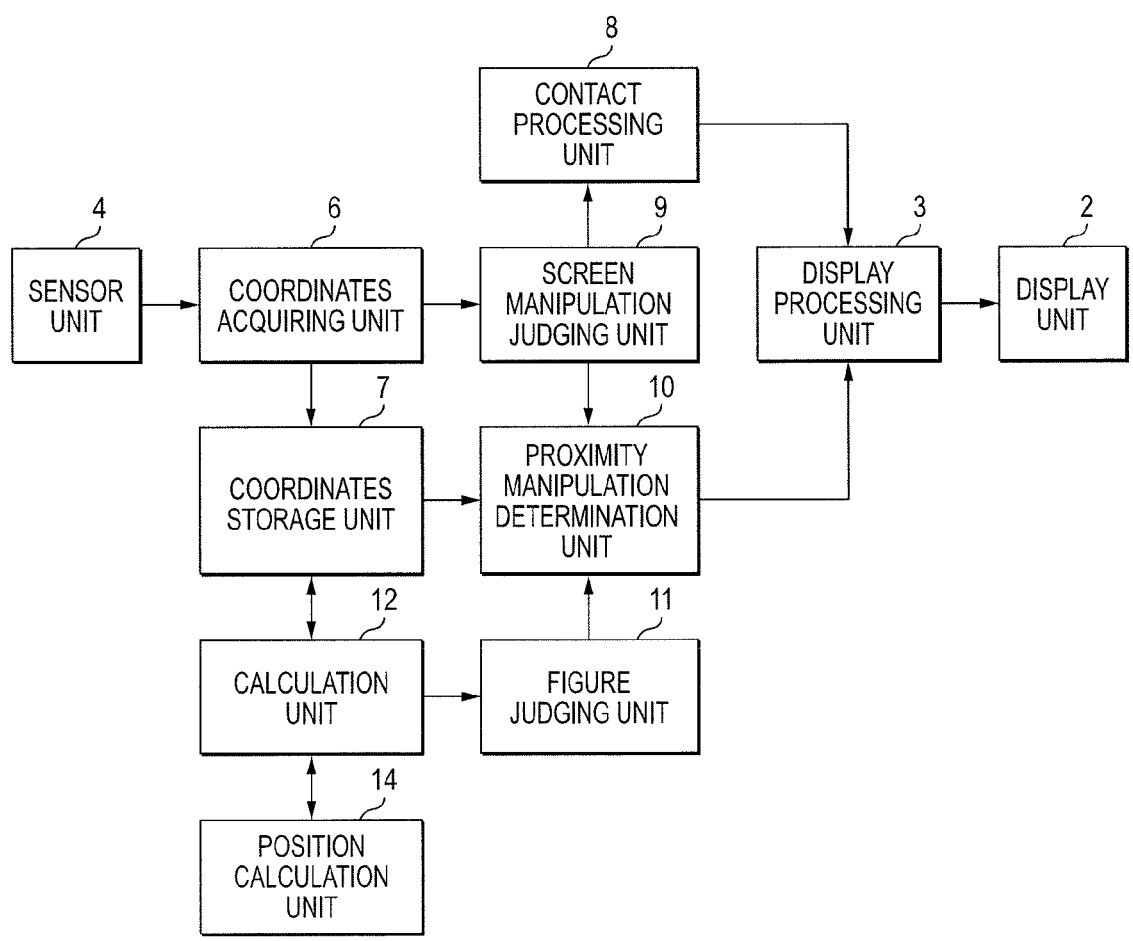
FIG. 16 is a block diagram showing an example processing flow of the hardware of the third embodiment.

FIG. 16 is a block diagram showing an example processing flow of the hardware of the third embodiment. This processing flow is different than in the second embodiment in that a position calculation unit 14 replaces the display item calculation unit 13.

The position calculation unit 14 calculates a distance between center coordinates O of a closed figure 40 and center coordinates, for example, of the button 31A. That is, the position calculation unit 14 calculates a distance by which the closed figure 40 should be moved. The position calculation unit 14 employs a drawing position of the closed figure 40 as a determined position, and calculates a distance between the center coordinates O of the closed figure 40 and the center coordinates of the target item 31 as a movement distance from the determined position. The proximity manipulation determination unit 10 supplies the display processing unit 3 and the control unit 5 with an event to the effect that a prescribed should be commanded on the basis of data and information received from the figure judging unit 11, the coordinates storage unit 7, and the screen manipulation judging unit 9 as well as the distance information received from the position calculation unit 14. The display processing unit 3 draws a boundary line 41 of the closed figure 40 and a center coordinates point indicating its center coordinates O on the display unit 2.

Figure 17:
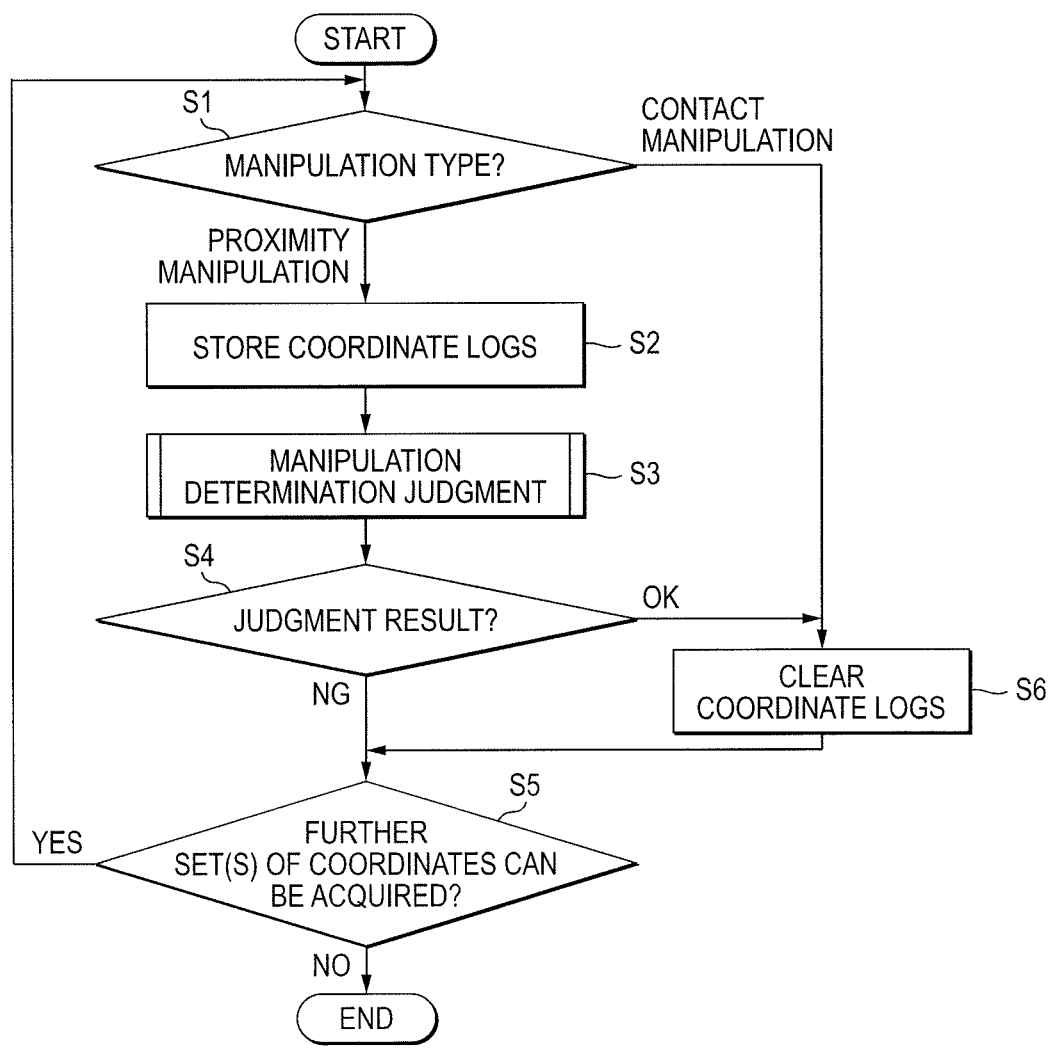
FIG. 17 is a flowchart of an example overall process according to the third embodiment.
Figure 18:
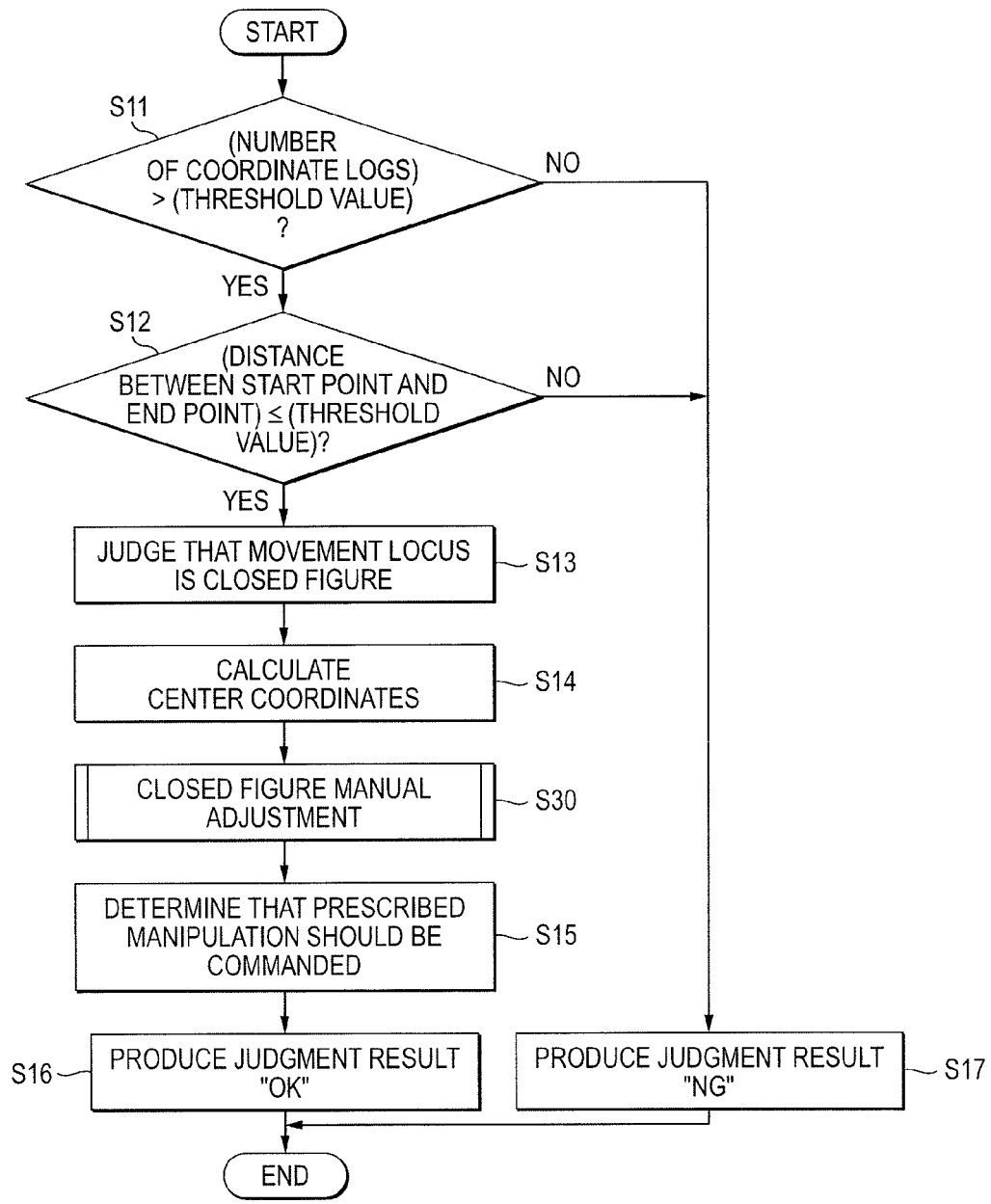
FIG. 18 is a flowchart of an example of a manipulation determination judgment process shown in FIG. 17.
Figure 19:
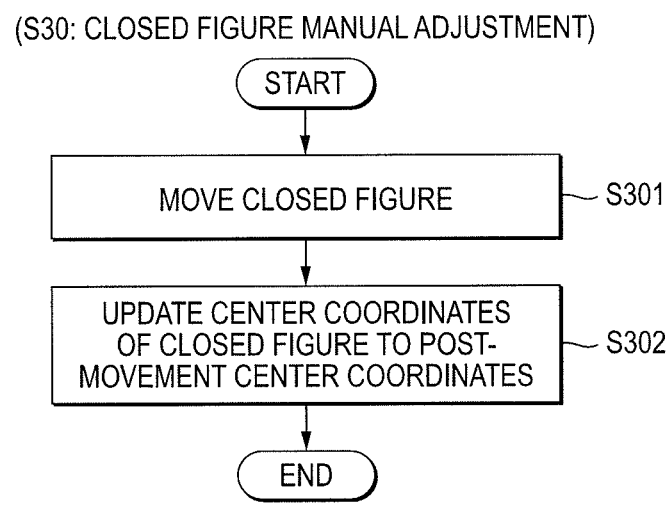
FIG. 19 is a flowchart of an example of a closed figure manual adjustment process shown in FIG. 18.

FIGS. 17-19 are flowcharts of processes according to the third embodiment. FIG. 17 is a flowchart of an example overall process according to the third embodiment, which is the same as in the second embodiment and hence will not be described. FIG. 18 is a flowchart of an example of a manipulation determination judgment process shown in FIG. 17. This manipulation determination judgment process is different than in the second embodiment in that step S30 (closed figure manual adjustment) replaces step S20 (closed figure automatic adjustment). FIG. 19 is a flowchart of an example of the closed figure manual adjustment process (step S30) shown in FIG. 18.

Referring to FIG. 19, at step S301, the user moves a closed figure 40 by moving a finger 20A additionally. The display processing unit 3 controls the display unit 2 so that the displayed closed figure 40 moves following an additional movement locus of the user finger 20A. If the user finger 20A has gone out of the proximity range or has stayed at the same position for a prescribed time, at step S302 the calculation unit 12 updates the center coordinates O of the closed figure 40 to post-movement center coordinates. Then the process is finished.

There may occur an event that a closed figure 40 drawn by the user does not enclose a target item 31 correctly. In particular, such an event may occur in a case that plural display items 30 are located in the vicinity of a target item 31 or a displayed target item 31 is small. In this embodiment, the user is allowed to move a closed figure 40 manually to the position of a target item 31, whereby the target item 31 can be manipulated reliably. The convenience of manipulation is enhanced by making it possible to draw a closed figure 40 at a position that is different from the position of a target item 31 and move the closed figure 40 manually to the position of a target item 31 freely.

Different operations may be performed when the commanding medium 20 is moved after it has stayed for a long time and when the commanding medium 20 is moved after it has stayed for a short time. For example, it is possible to enable movement of a closed figure 40 if the commanding medium 20 has stayed for a long time and to cancel an intended manipulation if the commanding medium 20 has stayed for a short time. Furthermore, although in the embodiment a closed figure 40 is moved by a proximity manipulation, it may be moved by a contact manipulation. Still further, although in the embodiment the distance between the center coordinates O of a closed figure 40 and the center coordinates of a target item 31 is employed as a movement distance, a distance between the start point or the end point of a closed figure 40 and the center coordinates of a target item 31 may be calculated and employed as a movement distance.

FIGS. 20A-20C are conceptual diagrams showing example kinds of closed figures that can be used in a fourth embodiment. If the user draws closed figures 40 shown in FIGS. 20A-20C, the figure judging unit 11 judges them to be a circle, a rectangle, and a triangle, respectively. It was described with reference to FIG. 2B that the kind of a prescribed manipulation (pushing, enlargement, reduction, scrolling, deletion, or the like) can be varied according to the shape of a closed figure 40. Proximity manipulations can be increased in variety by preparing plural sets of a shape of closed figure 40 and a corresponding manipulation.

Figure 21:
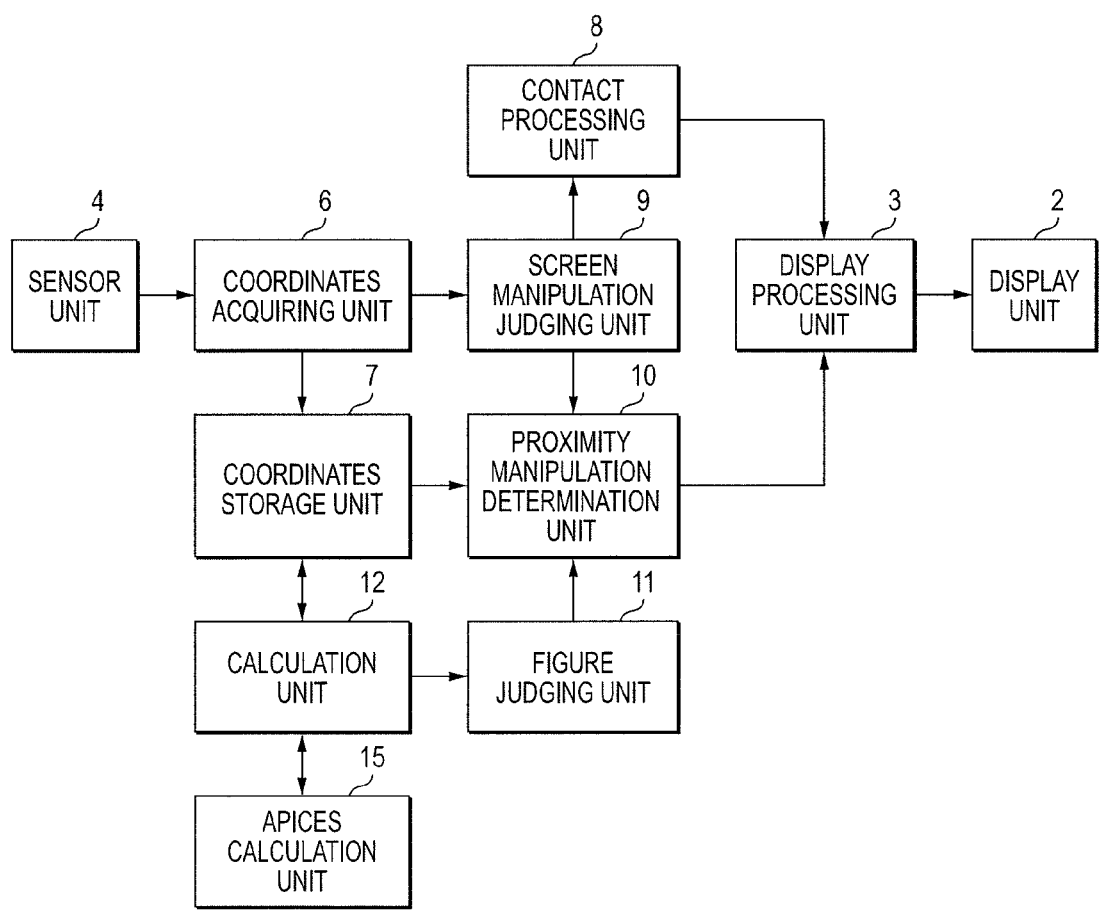
FIG. 21 is a block diagram showing an example processing flow of the hardware of the fourth embodiment.

FIG. 21 is a block diagram showing an example processing flow of the hardware of the fourth embodiment. This processing flow is different than in the first embodiment in that an apices calculation unit 15 is added. The apices calculation unit 15 judges whether or not a closed figure 40 has apices and, if apices exist, calculates the number of apices and an angle formed by sets of coordinates located on the two respective sides of each apex. The proximity manipulation determination unit 10 supplies the display processing unit 3 and the control unit 5 with an event to the effect that a prescribed should be commanded on the basis of data and information received from the figure judging unit 11, the coordinates storage unit 7, and the screen manipulation judging unit 9 as well as apices information received from the apices calculation unit 15. The display processing unit 3 draws a boundary line 41 of the closed figure 40 and a center coordinates point indicating its center coordinates O on the display unit 2.

Figure 22:
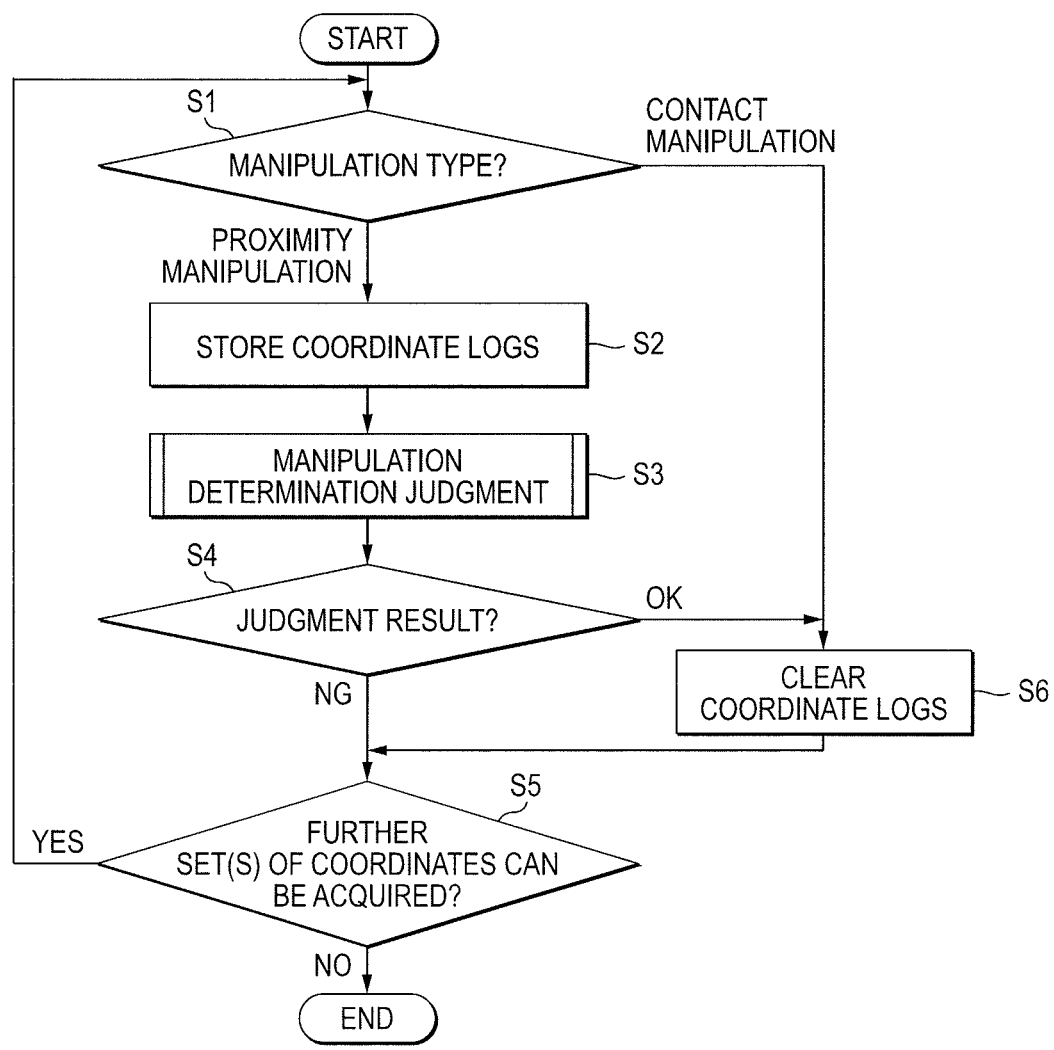
FIG. 22 is a flowchart of an example overall process according to the fourth embodiment.

FIGS. 22-26 are flowcharts of processes, according to the fourth embodiment, which mainly relate to figure judgment. FIG. 22 is a flowchart of an example overall process according to the fourth embodiment, which is the same as in the first embodiment and hence will not be described.

Figure 23:
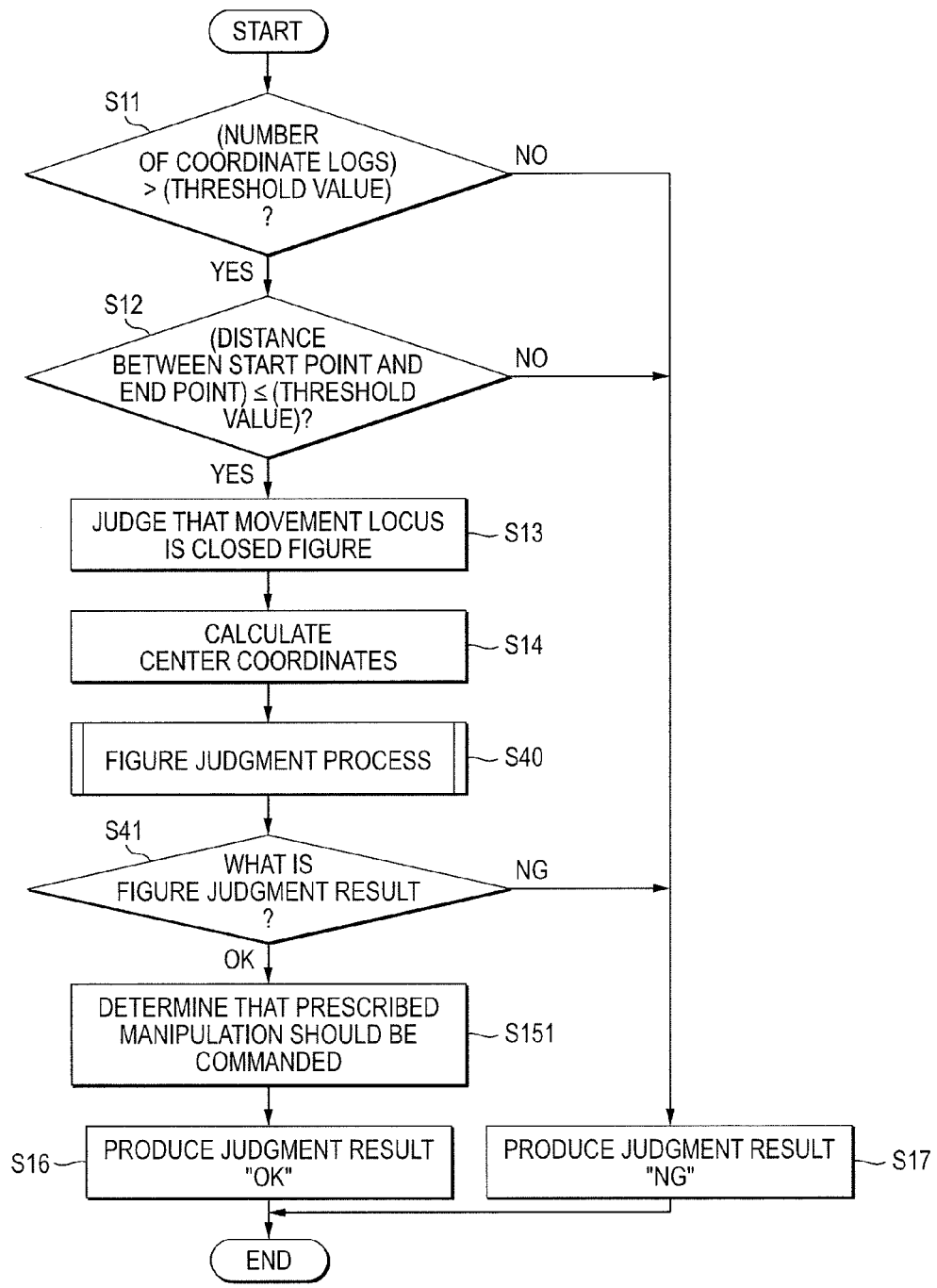
FIG. 23 is a flowchart of an example of a manipulation determination judgment process shown in FIG. 22.

FIG. 23 is a flowchart of an example of a manipulation determination judgment process shown in FIG. 22. This manipulation determination judgment process is different than in the first embodiment in steps S40, S41, and S151. Step S40 (figure judgment) and step S41 (branching according to a figure judgment result) are added after step S14 (calculation of center coordinates). At step S151 (determining that a prescribed manipulation should be commanded), the proximity manipulation determination unit 10 determines that a prescribed manipulation (pushing, enlargement, reduction, scrolling, deletion, or the like) should be commanded for a target item 31 according to the shape of a closed figure 40.

Figure 24:
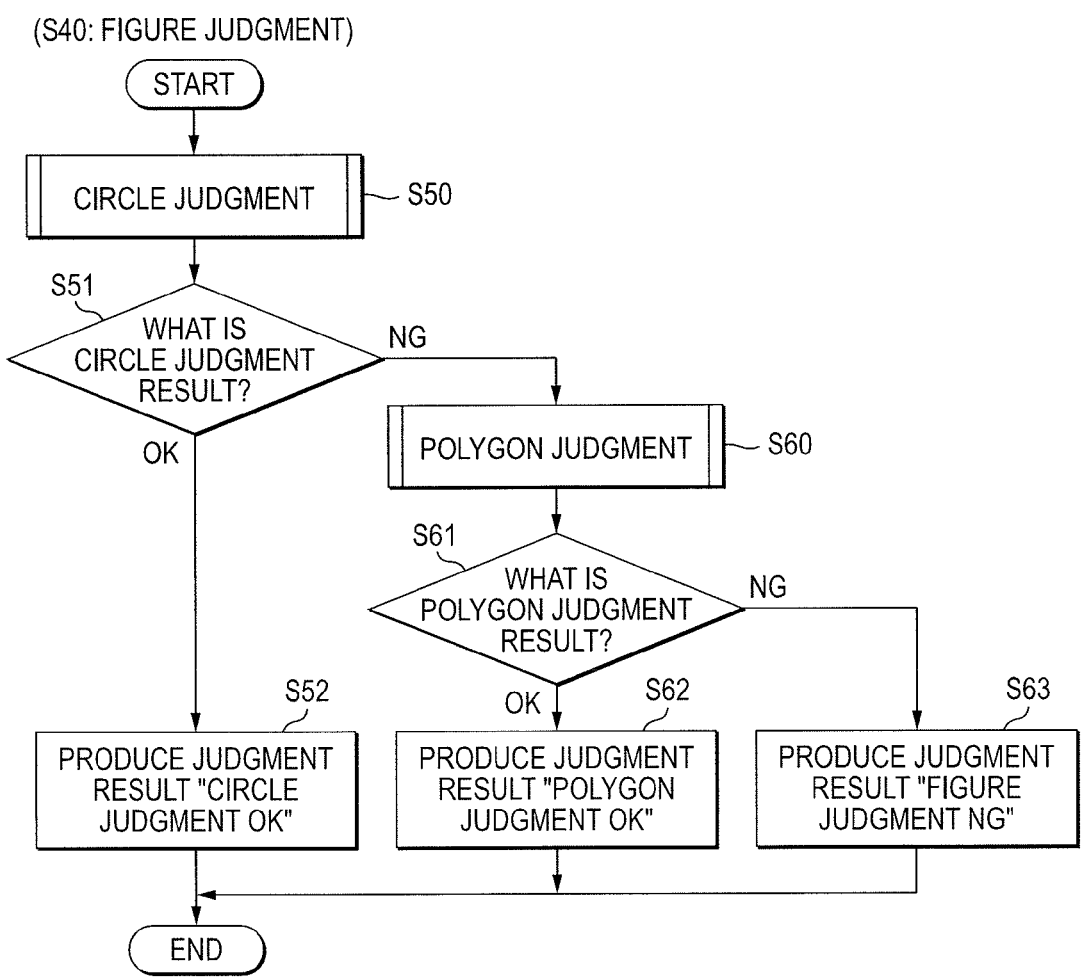
FIG. 24 is a flowchart of an example of a figure judgment process shown in FIG. 23.

FIG. 24 is a flowchart of an example of the figure judgment adjustment process (step S40) shown in FIG. 23. The figure judgment adjustment process (step S40) includes a circle judgment process (step S50) and a polygon judgment process (step S60). The term "circle" includes an approximately circular shape and an approximately elliptical shape that are drawn as curved lines. The term "polygon" includes an approximately triangular shape, an approximately quadrilateral shape, and shapes like other polygons.

First, at step S50, it is judged whether a closed figure 40 is classified as a circle. At step S51, the result of the circle judgment is checked. If the judgment result of step S51 is "OK" (circle), a judgment result "circle judgment OK" is produced at step S52. If the judgment result of step S51 is "NG" (not a circle), the process moves to step S60, where it is judged whether the closed figure 40 is classified as a polygon. At step S61, the result of the polygon judgment is checked. If the judgment result of step S61 is "OK" (polygon), a judgment result "polygon judgment OK" is produced at step S62. If the judgment result of step S61 is "NG" (not a polygon), a judgment result "figure judgment NG" is produced at step S63.

Figure 25:
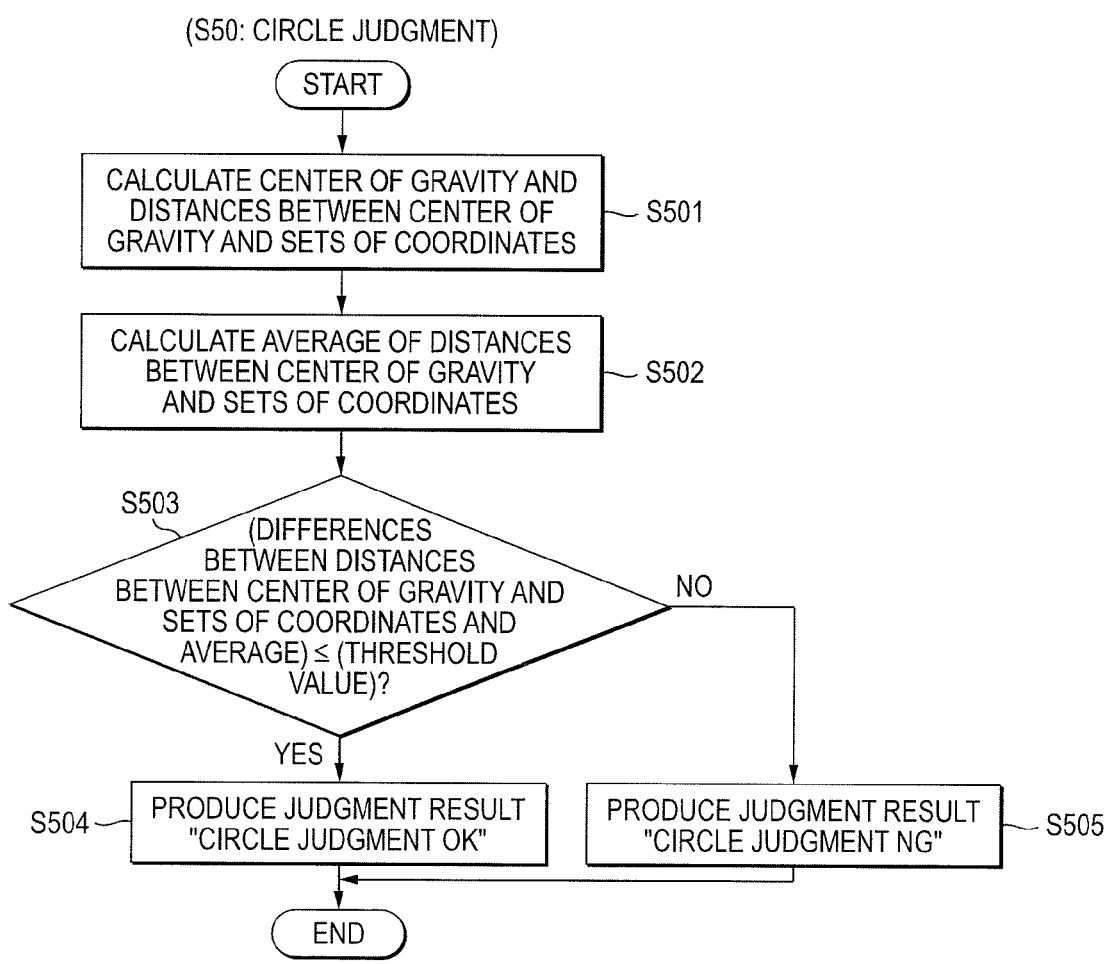
FIG. 25 is a flowchart of an example of a circle judgment process.

FIG. 25 is a flowchart of an example of the circle judgment process shown in FIG. 24. At step S501, the calculation unit 12 calculates a center of gravity of the closed figure 40 and distances between the calculated center of gravity and respective sets of coordinates acquired by the coordinates acquiring unit 6. At step S502, the calculation unit 12 calculates an average of the calculated distances between the center of gravity and the respective sets of coordinates. At step S503, the calculation unit 12 calculates differences between the distances between the center of gravity and the respective sets of coordinates and the calculated average and judges whether or not the calculated differences are smaller than or equal to a threshold value. If the calculated differences are smaller than or equal to the threshold value (S503: yes), at step S504 the figure judging unit 11 produces a judgment result "circle judgment OK." If not (S503: no), at step S505 the figure judging unit 11 produces a judgment result "circle judgment NG.")

Figure 26:
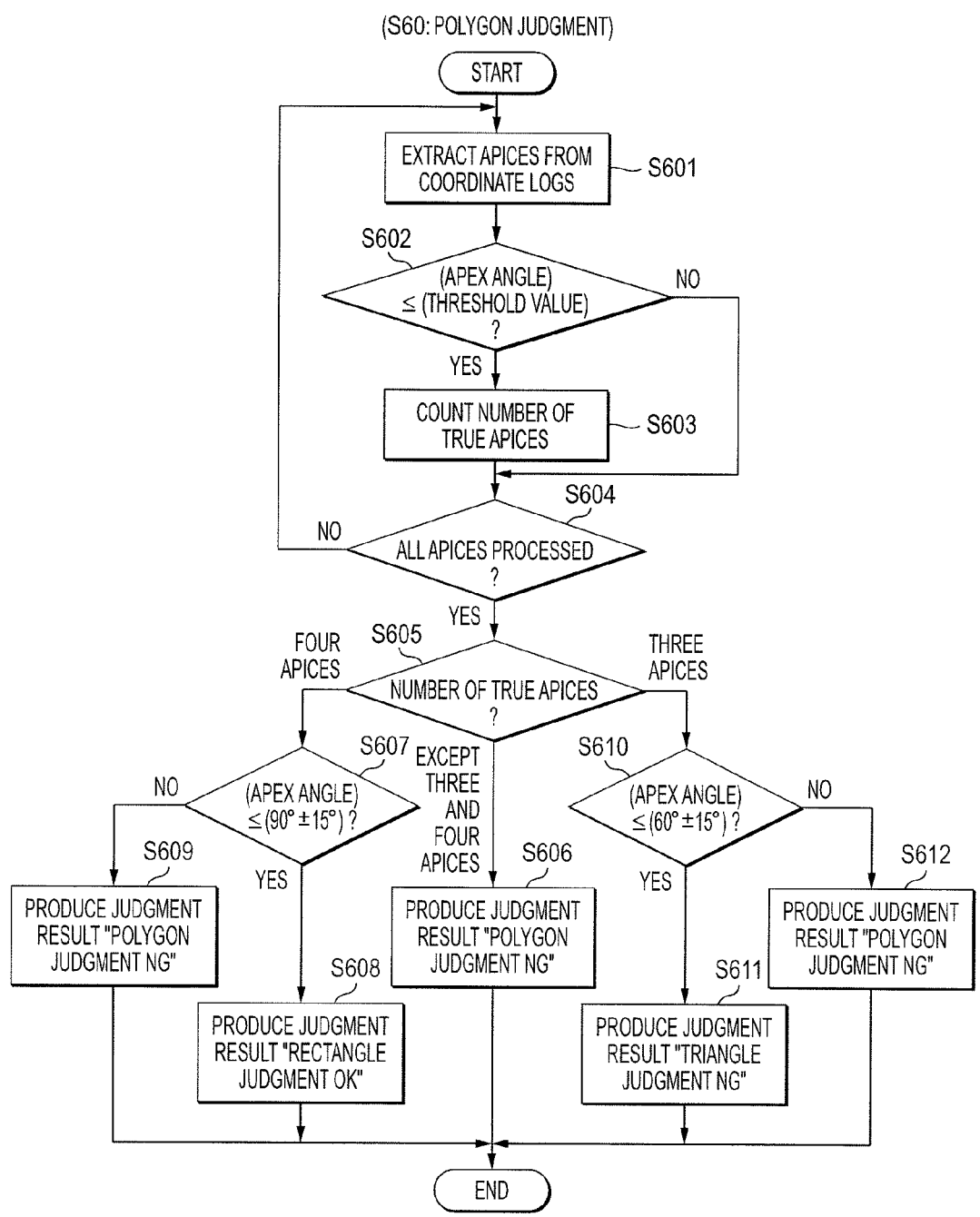
FIG. 26 is a flowchart of an example of a polygon judgment process.

FIG. 26 is a flowchart of an example of the polygon judgment process shown in FIG. 24. At step S601, the apex calculation unit 15 extracts an apex from coordinate logs of the closed figure 40 that are stored in the coordinates storage unit 7. At step S602, the apex calculation unit 15 calculates an angle of the extracted apex and judges whether or not the calculated angle is smaller than or equal to a threshold value. If the calculated angle is smaller than or equal to the threshold value (S602: yes), at step S603 the apex calculation unit 15 counts the number of true apices. At step S604, the apex calculation unit 15 judges whether all apices have been processed.

At step S605, the apex calculation unit 15 judges the number of true apices. If the number of true apices is not equal to three or four, a judgment result "polygon judgment NG" is produced at step S606. If the number of true apices is equal to four, at step S607 the apex calculation unit 15 judges whether or not the apex angles are within the range of 90°±15°. If the apex angles are within the range of 90°±15° (S607: yes), a judgment result "rectangle judgment OK" is produced at step S608. If the apex angles are not within the range of 90°±15° (S607: no), a judgment result "polygon judgment NG" is produced at step S609. If the number of true apices is equal to three, at step S610 the apex calculation unit 15 judges whether or not the apex angles are within the range of 60°±15°. If the apex angles are within the range of 60°±15° (S610: yes), a judgment result "triangle judgment OK" is produced at step S611. If the apex angles are not within the range of 60°±15° (S610: no), a judgment result "polygon judgment NG" is produced at step S612.

In the above embodiment, a shape of a closed figure 40 is judged using the distances between its center of gravity and sets of coordinates. However, the invention is not limited to such a case. For example, a slope between two points can be calculated by calculating differences between their X coordinates and between their Y coordinates. A line can be judged to be approximately a straight line or be a curved line by comparing slopes between a base point and n respective points, which in turn makes it possible to a figure being drawn has a circular shape or a polygonal shape. Furthermore, if sets of coordinates and their position vectors are known, it can be judged that whether a straight line or be a curved line being drawn. And an apex angle can be calculated using a vector inner product.

Although the proximity manipulation determination unit 10, the figure judging unit 11, and the calculation unit 12 have been described as separated units, the proximity manipulation determination unit 10 may perform a figure judgment or calculations. The above-described hardware components are just examples and may be modified as appropriate according to a use or a purpose.

The invention is not limited to the above embodiments, and various modifications, improvements, etc. can be made as appropriate. The material, shape, dimensions, related numerical values, form of implementation, number (where plural ones are provided), location, etc. of each constituent element of each embodiment are arbitrary and are not restricted as long as the invention can be implemented.

The present application is based on Japanese Patent Application No. 2012-289072 filed on Dec. 28, 2012, the contents of which are incorporated herein by reference.

The display apparatus, display method, and display program according to the invention can be applied to uses in which a prescribed manipulation for a target item is performed automatically by making a proximity manipulation on a display unit of a cellphone, a tablet PC, a notebook PC, or the like.

What is claimed is:

1. A display apparatus, comprising:
   a display;
   a sensor configured to detect a proximity movement of a commanding medium, the proximity movement being a movement by the commanding medium within a prescribed distance from the display without touching the display;
   an acquirer configured to acquire a locus on the display corresponding to the proximity movement;
   a judger configured to judge whether a figure of the acquired locus is a closed figure; and
   a manipulation determiner configured to determine, when the figure of the acquired locus is judged to be the closed figure, to perform a prescribed manipulation for coordinates on the display inside the closed figure,
   wherein when the commanding medium touches the display, the locus having been acquired before the commanding medium touches the display is excluded from the acquired locus to be judged by the judger.

2. The display apparatus according to claim 1,
   wherein if an area of the closed figure is smaller than a prescribed value, the manipulation determiner determines not to perform the prescribed manipulation.

3. The display apparatus according to claim 1,
   wherein if a shortest distance between a boundary line of the closed figure and the center coordinates of the closed figure is smaller than a prescribed value, the manipulation determiner determines not to perform the prescribed manipulation.

4. The display apparatus according to claim 1,
   wherein if a difference between a longest distance and a shortest distance between a boundary line of the closed figure and the center coordinates of the closed figure is larger than a prescribed value and/or a ratio of the longest distance to the shortest distance is larger than a prescribed value, the proximity manipulation determiner determines not to perform the prescribed manipulation.

5. A terminal apparatus, comprising the display apparatus according to claim 1.

6. The display apparatus according to claim 1, further comprising:
   a calculator configured to calculate center coordinates of the closed figure,
   wherein the manipulation determiner is configured to determine, when the judger judgers the figure of the acquired locus is the closed figure, to perform a prescribed manipulation for center coordinates of the closed figure.

7. The display apparatus according to claim 6,
   wherein the display is further configured to display one or more target items, and the manipulation determiner is further configured to determine and to perform the prescribed manipulation for the target item, if center coordinates of the closed figure and the target item overlap each other.

8. The display apparatus according to claim 7,
   wherein if a ratio of an overlapped area between the closed figure and the target item to an area of the closed figure is smaller than a prescribed value, the manipulation determiner determines not to perform the prescribed manipulation for the target item, even if center coordinates of the closed figure overlaps the target item.

9. The display apparatus according to claim 6,
   wherein the calculator is configured to calculate the center coordinates by dividing the sum of edge vectors of the closed figure by the number of edges of the closed figure.

10. The display apparatus according to claim 6,
    wherein the calculator is configured to the center coordinates based on a center of a circumscribed rectangle contacted with each apex of the closed figure.

11. The display apparatus according to claim 6,
    wherein the calculator is configured to calculate the center coordinates based on a point having the same distance from arbitrary three apices of the closed figure.

12. The display apparatus according to claim 6,
    wherein the calculator is configured to calculate the center coordinates based on an area centroid of the closed figure.

13. The display apparatus according to claim 1, further comprising:
    a storage configured to store a log of coordinates corresponding to the proximity movement,
    wherein the acquirer is configured to acquire the locus corresponding to the stored log, and the storage is further configured to clear the log when the commanding medium touches the display, and
    wherein, by the clearing of the log, the locus having been acquired before the commanding medium touches the display is excluded from the acquired locus to be judged in the judging.

14. A display method for an apparatus including a display, comprising:
    detecting a proximity movement of a commanding medium, the proximity movement being a movement by the commanding medium within a prescribed distance from the display without touching the display;
    acquiring a locus on the display corresponding to the proximity movement;
    judging whether a figure of the acquired locus is a closed figure;
    determining, when the figure of the acquired locus is judged to be the closed figure, to perform a prescribed manipulation for the calculated center coordinates on the display inside the closed figure,
    wherein when the commanding medium touches the display, the locus having been acquired before the commanding medium touches the display is excluded from the acquired locus to be judged in the judging.

15. A non-transitory computer-readable storage medium having a computer-executable display program, which when executed by a computer connected to a display, causes the computer to execute the following operations:
    detecting a proximity movement of a commanding medium, the proximity movement being a movement by the commanding medium within a prescribed distance from the display without touching the display;
    acquiring a locus on the display corresponding to the proximity movement;
    judging whether a figure of the acquired locus is a closed figure;
    determining, when the figure of the acquired locus is judged to be the closed figure, to perform a prescribed manipulation for coordinates on the display inside the closed figure;
    wherein when the commanding medium touches the display, the locus having been acquired before the commanding medium touches the display is excluded from the acquired locus to be judged in the judging.

* * * * *